United States Patent
Tokuchi

(10) Patent No.: US 12,149,816 B2
(45) Date of Patent: Nov. 19, 2024

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 687 days.

(21) Appl. No.: 17/149,725

(22) Filed: Jan. 15, 2021

(65) Prior Publication Data

US 2022/0038637 A1 Feb. 3, 2022

(30) Foreign Application Priority Data

Jul. 30, 2020 (JP) .................................. 2020-129302

(51) Int. Cl.
*H04N 23/63* (2023.01)
*G06T 19/00* (2011.01)
*H04N 23/61* (2023.01)
*H04N 23/62* (2023.01)

(52) U.S. Cl.
CPC ......... *H04N 23/631* (2023.01); *G06T 19/006* (2013.01); *H04N 23/61* (2023.01); *H04N 23/62* (2023.01)

(58) Field of Classification Search
CPC ...... H04N 23/631; H04N 23/61; H04N 23/62; H04N 23/63; G06T 19/006; G06T 2219/004; G06F 3/04815; G06F 3/0486; G06F 3/147
See application file for complete search history.

(56) References Cited

FOREIGN PATENT DOCUMENTS

| JP | 2013125328 | 6/2013 |
|---|---|---|
| JP | 2013-183333 | 9/2013 |
| JP | 2015-075832 | 4/2015 |
| JP | 2019125345 | 7/2019 |
| WO | 2013088819 | 6/2013 |

OTHER PUBLICATIONS

Information Processor, Information Processing Method, Program and System (Makoto Tomioka et al.) JP2019125345 (Year: 2019).*
"Office Action of Japan Counterpart Application", issued on Jan. 23, 2024, with English translation thereof, pp. 1-6.

* cited by examiner

*Primary Examiner* — Yogesh K Aggarwal
(74) *Attorney, Agent, or Firm* — JCIPRNET

(57) ABSTRACT

An information processing apparatus includes a processor configured to display an image taken by an imaging device in each of plural regions provided within a display surface and set, for each of the plural regions, which information is to be displayed in association with a position of a subject within the image.

18 Claims, 27 Drawing Sheets

FIG. 16A
10A
FIG. 16B
10A
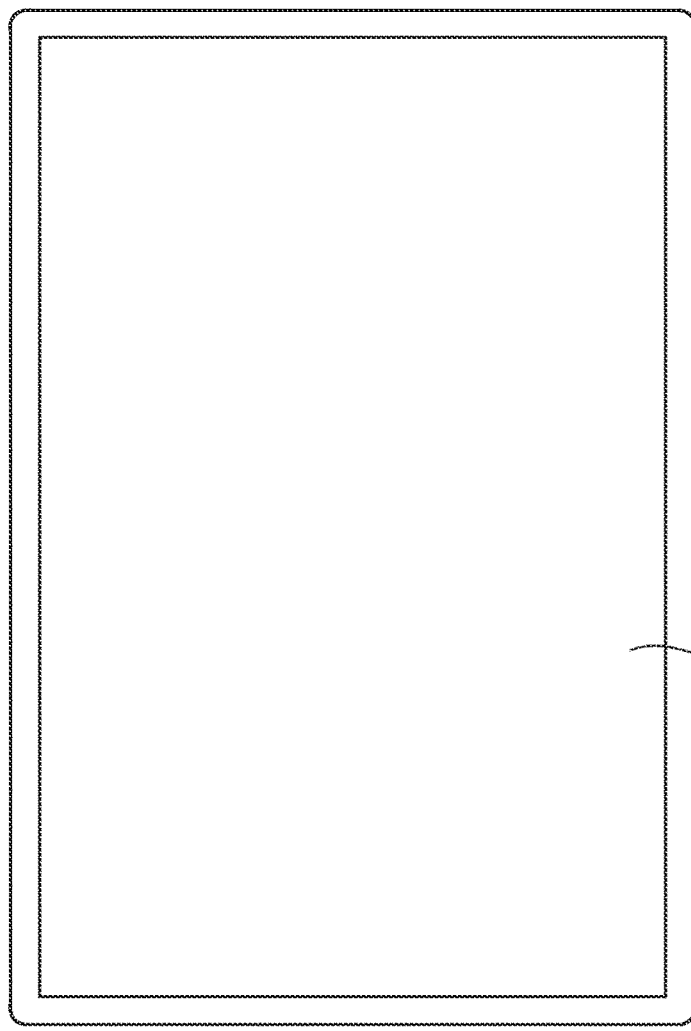
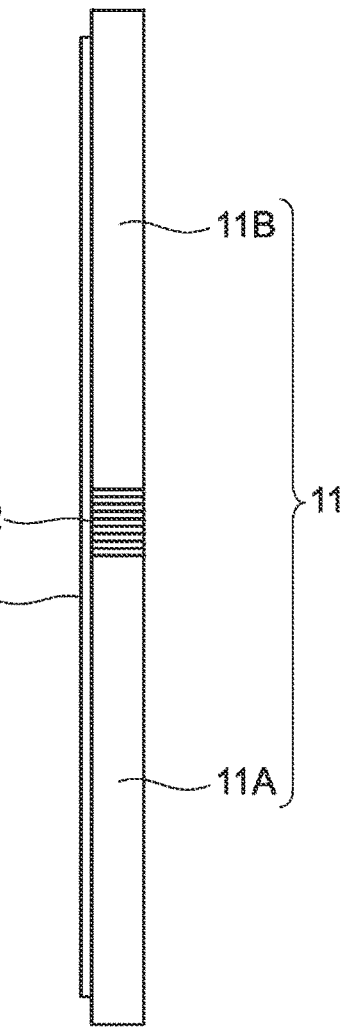
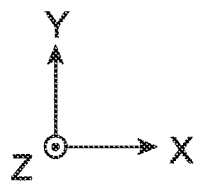
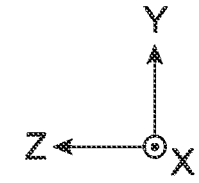

FIG. 22A
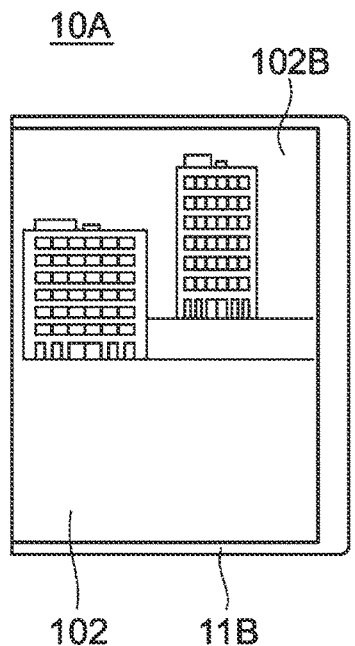
FIG. 22B
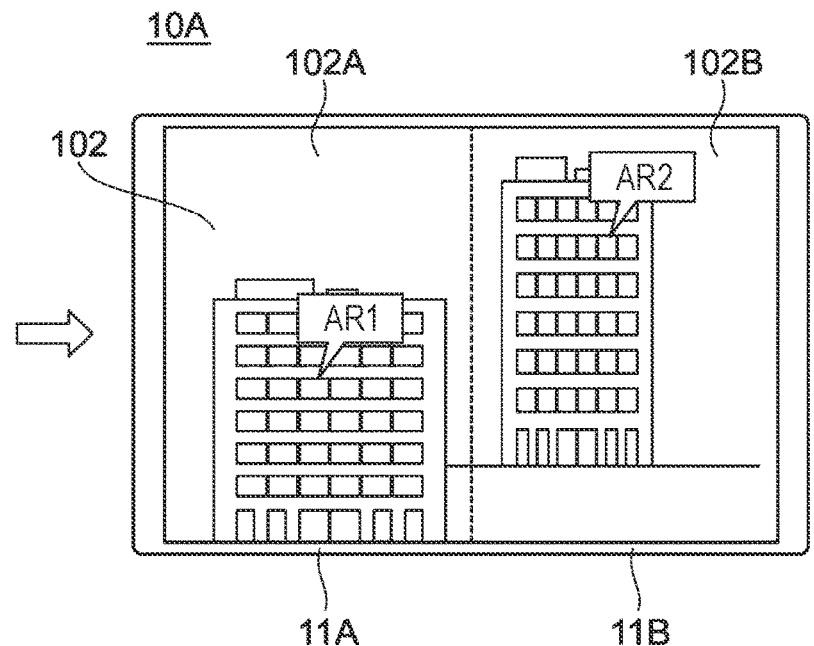
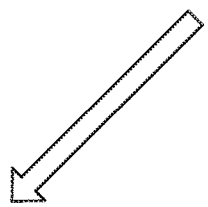
FIG. 22C
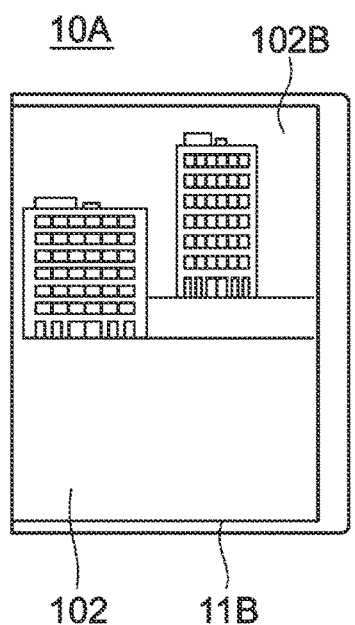
FIG. 22D
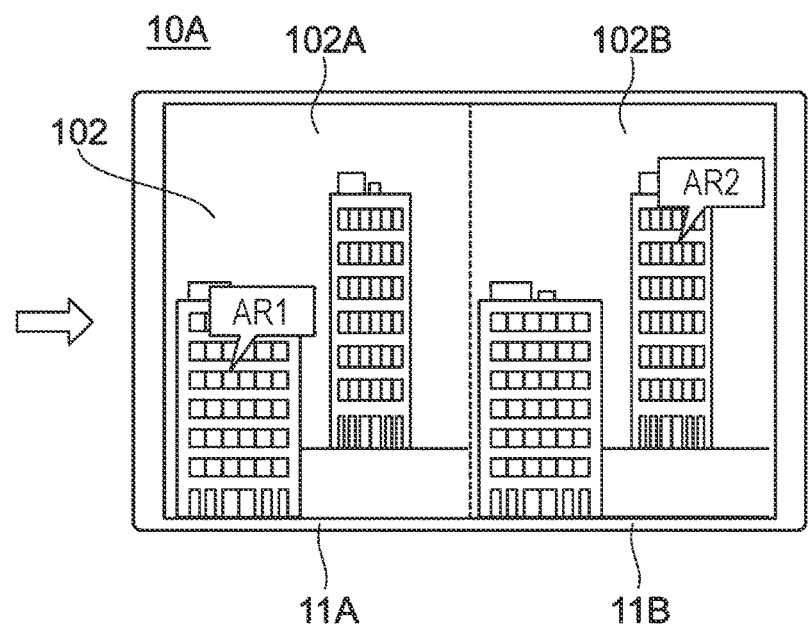

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-129302 filed Jul. 30, 2020.

BACKGROUND

(i) Technical Field

The present disclosure relates to an information processing apparatus and a non-transitory computer readable medium.

(ii) Related Art

For example, an application for adding augmented reality (AR) content to as image taken in a city is available on smartphones. For example, services such as a service of overlaying information concerning a building or a shop (hereinafter referred to as a "building or the like") on top of the building or the like within an image, a service of overlaying translation of a text on top of the text within as image, and a service of overlaying a virtual creature or the like on an image are available.

See, for example, Japanese Unexamined Patent Application Publication No. 2013-12328.

SUMMARY

It is expected that the number of pieces of information and an amount of information associated with a subject within an image increase in the future as the quality of the services improve. However, displaying too many pieces of information or too much information within a limited space of a display surface deteriorates viewability of information, resulting in poor accessibility to target information.

Aspects of non-limiting embodiments of the present disclosure relate to a technique of giving information associated with a subject within a taken image in various manners as compared with a case where such information is given in a uniform manner.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to display an image taken by an imaging device in each of a plurality of regions provided within a display surface and set, for each of the plurality of regions, which information is to be displayed in association with a position of a subject within the image.

BRIEF DESCRIPTION OF THE DRAWINGS

Exemplary embodiments of the present disclosure will be described in detail based on the following figures, wherein:

FIG. 6A illustrates an example of a screen before use of the AR service, and FIG. 6B illustrates an example a screen after use of the AR service;

FIG. 7A illustrates an example of a screen used to designate whether or not to display AR content, and FIG. 7B illustrates an example of a screen used to designate displayed AR content;

FIG. 12A illustrates a case where 5G communication whose communication speed is relatively high is available, and FIG. 12B illustrates a case where 4G communication whose communication speed is relatively low is available;

FIG. 13A illustrates an example of an edit screen used to edit a comment on a subject, and FIG. 13B illustrates an example of an action for associating a comment with a specific position on a subject;

FIGS. 16A and 16B are views for explaining an example of an outer configuration of a mobile terminal used in the second exemplary embodiment, FIG. 16A is a front view of the mobile terminal, and FIG. 16B is a side view of the mobile terminal;

FIG. 17A illustrates an example of outer appearance of the mobile terminal that has been folded, and FIG. 17B illustrates an example of outer appearance of the mobile terminal that has not been folded yet;

FIG. 19A illustrates an example of a screen displayed in a case where a display is folded into halves, and FIG. 19B illustrates an example of a screen displayed in a case where the display is unfolded;

FIG. 20A illustrates an example of a screen displayed in a case where the display is folded into halves, and FIG. 20B illustrates an example of a screen displayed in a case where the display is unfolded;

FIG. 21A illustrates an example of a screen displayed in a case where the display is folded into halves, and FIG. 21B illustrates an example of a screen displayed in a case where the display is unfolded;

FIGS. 22A through 22D are views for explaining transition of deformation of the mobile terminal and a change of a displayed screen, FIG. 22A illustrates an example of a screen displayed in a case where the display is folded into halves, FIG. 22B illustrates an example of a screen displayed in a case where the display is unfolded, FIG. 22C illustrates an example of a screen displayed in a case where the display is folded into halves again, and FIG. 22D illustrates an example of a screen displayed in a case where the display is unfolded again;

FIG. 23A illustrates an example of a screen displayed in a case where the display is folded into halves, FIG. 23B illustrates an example of a screen displayed in a case where the display is unfolded, FIG. 23C illustrates an example of a screen displayed in a case where the display is folded into halves again, and FIG. 23D illustrates an example of a screen displayed in a case where the display is unfolded again;

FIG. 24A illustrates an example in which a folded state of the display is allocated to display of a taken image, and FIG. 24B illustrates an example in which an unfolded state of the display is allocated to display of an edit screen;

FIG. 25A is a front view of the mobile terminal, and FIG. 25B is a side view of the mobile terminal;

FIG. 26A illustrates an example of outer appearance of the mobile terminal that has been folded, and FIG. 26B illustrates an example of outer appearance of the mobile terminal that has not been folded yet;

FIG. 27A is a front view of the mobile terminal, and FIG. 27B is a side view of the mobile terminal;

FIG. 28A illustrates a state where one body panel is stored below the other body panel, FIG. 28B illustrates a state where a part of one body panel has been drawn out from below the other body panel, and FIG. 28C illustrates a state where the one body panel has been entirely drawn out;

DETAILED DESCRIPTION

Exemplary embodiments of the present disclosure are described below with reference to the drawings.

First Exemplary Embodiment

System Configuration

Figure 1:
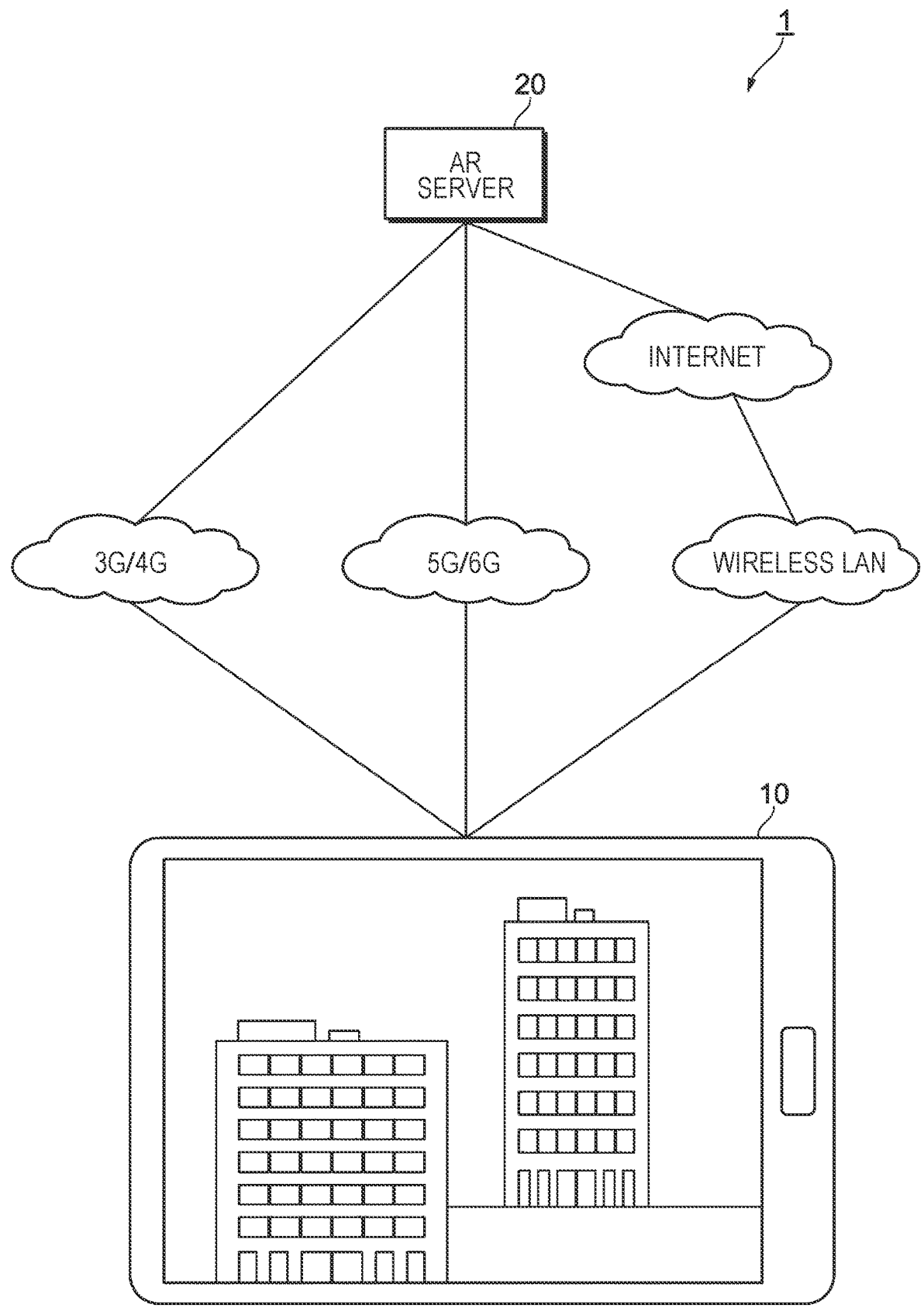
FIG. 1 illustrates an example of a configuration of a network system used in an AR service intended in the first exemplary embodiment.

FIG. 1 illustrates an example of a configuration of a network system 1 used in an AR service intended in the first exemplary embodiment.

The network system 1 includes a mobile terminal 10 operated by a user and a server (hereinafter referred to as an "AR server") 20 that offers an AR service to the mobile terminal 10.

The AR service is a service of reflecting content (hereinafter referred to as "AR content") created by a computer in an image of the real world taken by the mobile terminal 10. The AR content in the present exemplary embodiment is an image.

The AR service in the present exemplary embodiment becomes available in response to an instruction given from a user on the mobile terminal 10. This instruction is, for example, an instruction to execute an application program (hereinafter referred to as an "app") for using the AR service. In a case where the AR service is offered as a cloud service, access to the AR server 20 is also an instruction from a user.

In the present exemplary embodiment, a marker-less AR service that does not need a marker to display AR content is Intended. Note, however, that the AR service may be a location-based AR service that uses only positional information.

The AR content is displayed in association with a subject recognized as a target of the AR service in an image taken by the mobile terminal 10. In this respect, the AR content in the present exemplary embodiment is an example of information displayed in association with a position of a subject. An image reflecting the AR content is also referred to as an "AR composite image". A user sees an AR composite image displayed on the mobile terminal 10.

The mobile terminal 10 according to the present exemplary embodiment communicates with the AR server 20 through generations of mobile communication systems or a network combining a wireless local area network (LAN) and the Internet. Which path is used for communication is decided depending on an environment in which the mobile terminal 10 is used or by user's selection.

In the present exemplary embodiment, the mobile communication systems are classified into the third generation (i.e., 3G) and the fourth generation (i.e., 4G) of a relatively low communication speed and the fifth generation (i.e., 5G) and the sixth generation (i.e., 6G) of a relatively high communication speed.

In the present exemplary embodiment, a user can use the AR service in real time without restriction in a case where 5G or 6G communication is available. Meanwhile, in a case where only 3G or 4G communication is available, there may be delay or restrictions of contents when a user uses the AR service.

In the present exemplary embodiment, any one of IEEE802.11a, 11b, 11g, 11n, 11ac, 11ad, and 11ax is used as the wireless LAN. Note, however, that the entire path of communication may be a wired path. Even a communication speed of communication passing a wired path depends on an environment in which the mobile terminal 10 is used.

Assumed examples of the mobile terminal 10 according to the present exemplary embodiment include a smartphone, a tablet terminal, a gaming console, and a wearable terminal.

The mobile terminal 10 is a computer and includes a camera, a display, and a communication module. Although only one mobile terminal 10 is illustrated in FIG. 1, the network system 1 may include plural mobile terminals 10.

The AR server 20 according to the present exemplary embodiment works together with the mobile terminal 10 and causes an AR composite image to be displayed on the mobile terminal 10. Although single AR server 20 is illustrated in FIG. 1, the AR server 20 may be plural servers that work together. The AR server 20 according to the present exemplary embodiment is an example of an information processing apparatus.

Configurations of Devices
Configuration of Mobile Terminal 10

Figure 2:
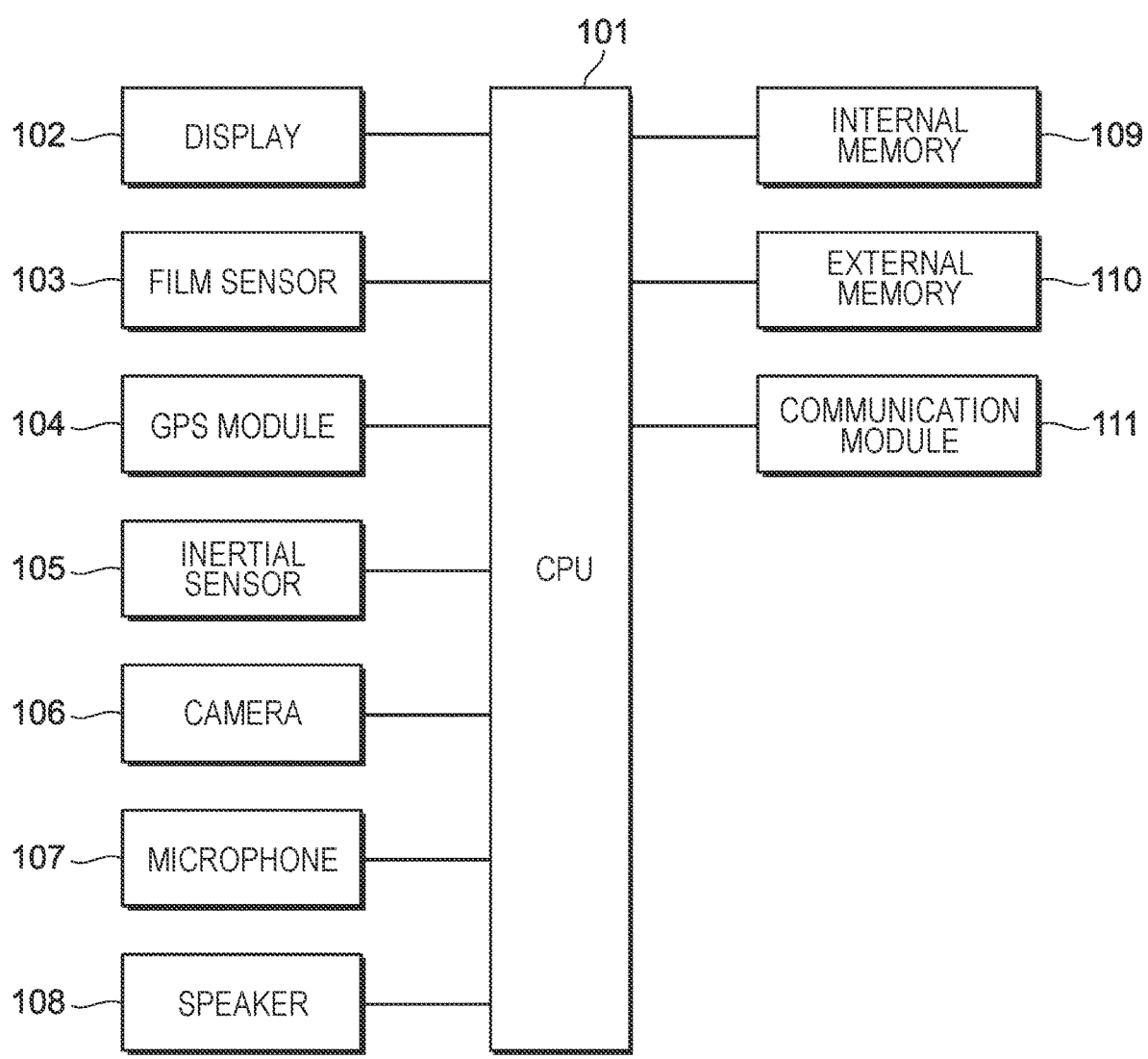
FIG. 2 is a view for explaining an example of a hardware configuration of a mobile termini used in the first exemplary embodiment.

FIG. 2 is a view for explaining an example of a hardware configuration of the mobile terminal 10 used in the first exemplary embodiment.

The mobile terminal 10 illustrated in FIG. 2 includes a central processing unit (CPU) 101 that, controls each unit through execution of programs, a display 102 that displays an image and other kinds of information, a capacitance film sensor 103 that detects an operation on a software keyboard (hereinafter also referred to as a "softkey") displayed on the display 102, a GPS module 104 that measures a position of the mobile terminal 10 by detecting a global positioning system (GPS) signal, an inertial sensor 105, a camera 106, a microphone 107 used for phone calls and recording, and a speaker 108 used for audio output, an internal memory 109 in which system data and internal data are stored, an external memory 110 that serves as an auxiliary storage device, and a communication module 111 used for communication with external devices including the AR server 20.

In the present exemplary embodiment, the internal memory 109 and the external memory 110 are semiconductor memories. The internal memory 109 has a read only memory (ROM) in which a Basic Input Output System (BIOS) and the like are stored and a random access memory (RAM) used as a first storage device. The CPU 101 and the internal memory 109 constitute a computer. The CPU 101 uses the RAM as a program work space. In the external memory 110, firmware and apps are stored.

The display 102 is, for example, an organic Electro Luminescent (EL) display or a liquid crystal display. The display 102 according to the present exemplary embodiment is provided on a single substrate. In the present exemplary embodiment, an image and other kinds of information are displayed on a surface (i.e., a display surface) of the display 102. Examples of the image include an image (hereinafter referred to as a "taken image") taken by the camera 106. The display 102 according to the present exemplary embodiment is not bendable nor foldable.

The film sensor 103 is disposed on the surface of the display 102. The film sensor 103 does not hinder observation of information displayed on the display 102 and detects a position operated by a user on the basis of a change in capacitance.

The GPS module 104 is used to measure a position of the mobile terminal 10. Note that the position of the mobile terminal 10 may be measured by using sensor technology other than the GPS module 104. For example, the position of the mobile terminal 10 may be measured on the basis of a Bluetooth (Registered Trademark) signal or a WiFi signal received from a beacon.

The inertial sensor 105 is, for example, a 6-axis sensor that detects an acceleration and an angular velocity. A posture of the mobile terminal 10 can be detected by using the inertial sensor 105. In addition, the mobile terminal 10 may include a geomagnetic sensor. A direction in which an image is taken may be specified by using the geomagnetic sensor.

The camera 106 uses, for example, a Complementary Metal Oxide Semiconductor (CMOS) image sensor or a Charge-Coupled Device (CCD) image sensor. In the present exemplary embodiment, the camera 106 is integral with the mobile terminal 10. The mobile terminal 10 may include plural cameras 106. The camera 106 is an example of an imaging device.

The microphone 107 is a device that converts user's voice or ambient sound into an electric signal. In the present exemplary embodiment, the microphone 107 is used to receive a voice instruction from a user. For example, the microphone 107 is used to receive an instruction concerning the number of regions used to display AR content and the kind of AR content displayed in each region.

The speaker 108 is a device that converts an electric signal into sound and outputs the sound.

The communication module 111 has a module that supports a mobile communication system and a module that supports a wireless LAN.

Figure 3:
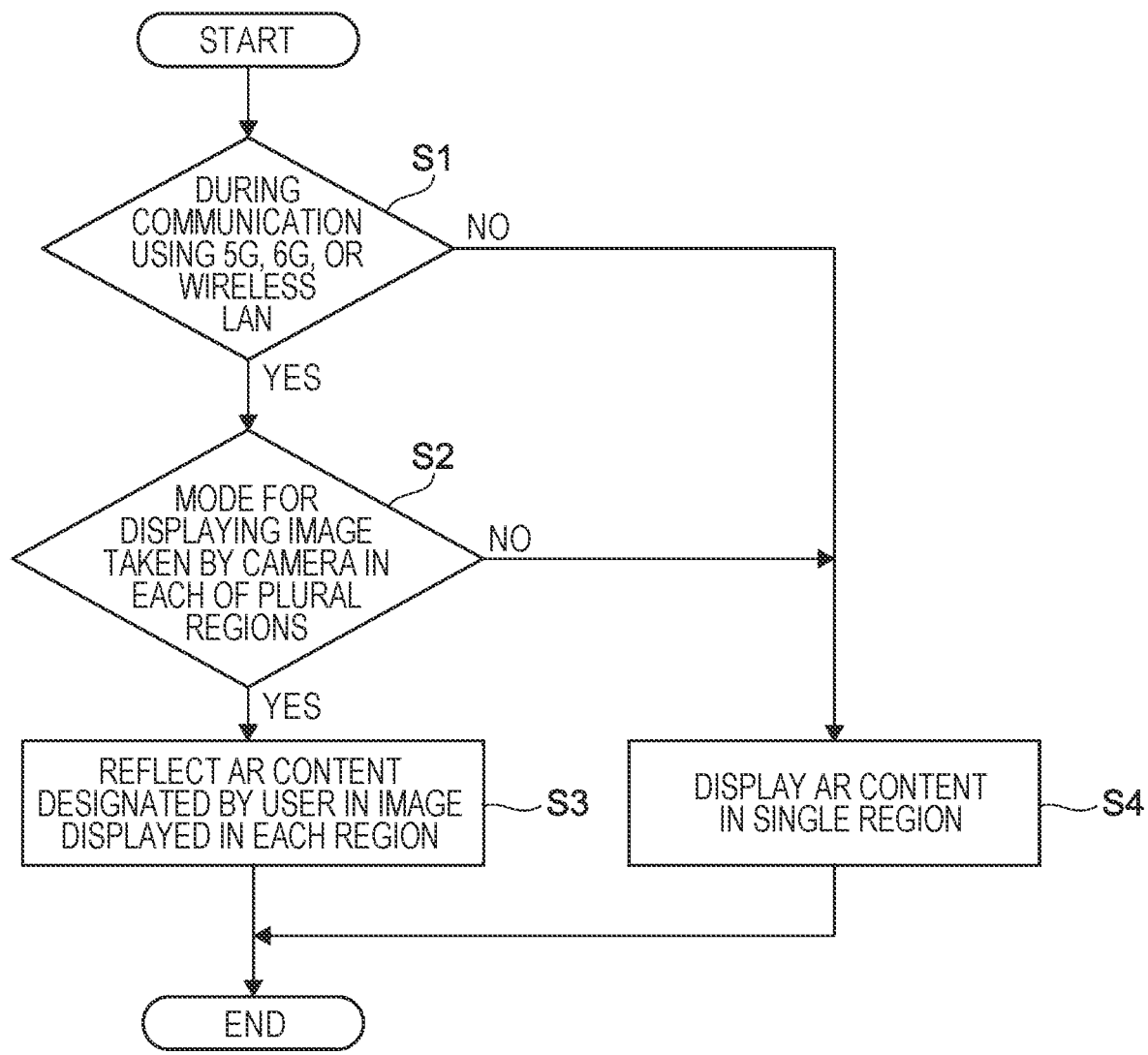
FIG. 3 is a flowchart for explaining an example of processing operation executed by a mobile terminal using the AR service.

FIG. 3 is a flowchart for explaining an example of processing operation executed by the mobile terminal 10 using the AR service. The processing illustrated in FIG. 3 is executed by the CPU 101 (see FIG. 2). The symbol "S" in FIG. 3 represents a step.

The CPU 101 monitors a state of communication of the communication module 111 (see FIG. 2) and determines whether or not the communication module 111 is performing communication by using 5G, 6G, or a wireless LAN (step 1).

This determining process is performed, for example, on the basis of a used communication method and an effective speed of communication with the AR server 20. For example, in a case where the speed of communication is lower than a predetermined speed, the CPU 101 obtains a negative result in step 1. Conversely, in a case where the speed of communication is higher than a predetermined speed, the CPU 101 obtains a positive result in step 1.

In a case where a positive result is obtained in step 1, the CPU 101 determines whether or not, a display mode is a mode for displaying an image taken by the camera 106 (see FIG. 2) in each of plural regions (step 2). In the present exemplary embodiment, the user of the mobile terminal 10 can give an instruction concerning the display mode. The user's instruction may be an instruction entered by using a softkey or may be a voice instruction.

In a case where a positive result is obtained in both of steps 1 and 2, the CPU 101 reflects AR content designated by the user in an image displayed in each region (step 3). In the present exemplary embodiment, the number of regions is two. The user may preset three or more regions. However, setting regions means dividing the display surface, and therefore setting too many regions relative to the area of the display surface may undesirably deteriorate viewability of AR content. In view of this, in the present exemplary embodiment, the number of regions in which the same image taken by the camera 106 is displayed is two.

The AR content displayed in each region can be designated by the user. By designating AR content displayed in each region, the number of pieces of AR content displayed in each region can be reduced, and association between AR content and a subject can be easily checked. Note that the AR content displayed in each region can be set in advance.

In the present exemplary embodiment, the user can give an instruction for changing a size of each region. Although the two regions basically have the same size, the sizes of the regions may be changed on the basis of an instruction from the user. For example, the size of one region may be set to 60% of the display surface and the size of the other region may be set to 40% of the display surface.

In addition, the user can perform a pinch-out gesture of increasing a distance between two fingers to enlarge an image displayed in a region and a pinch-in gesture of decreasing a distance between two fingers to reduce an image displayed in a region while keeping the sizes of the regions.

In a case where a negative result is obtained in step 1 or 2, the CPU 101 displays AR content in a single region (step 4). This case corresponds to a situation where it is difficult to reflect AR content instantly due to a low communication speed or a situation where the user wants AR content to be displayed in a single region.

Configuration of AR server 20

Figure 4:
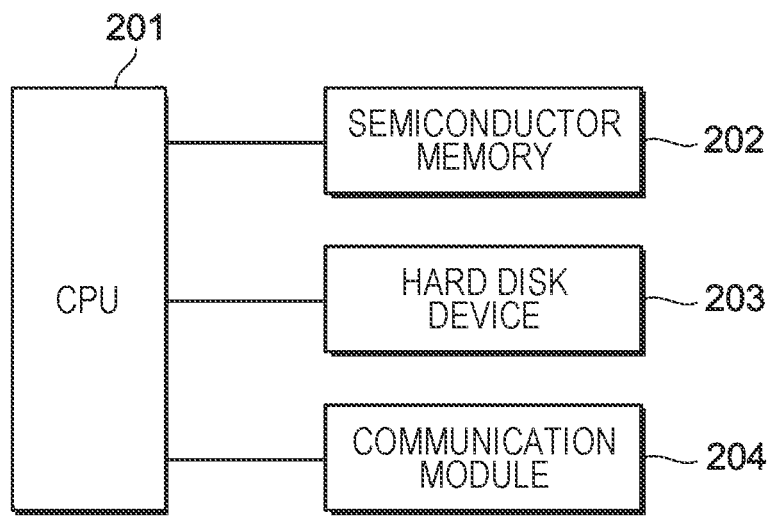
FIG. 4 is a view for explaining an example of a hardware configuration of an AR server used in the first exemplary embodiment.

FIG. 4 is a view for explaining an example of a hardware configuration of the AR server 20 used in the first exemplary embodiment.

The AR server 20 illustrated in FIG. 4 includes a CPU 201 that controls each unit through execution of programs, a semiconductor memory 202 in which system data and internal data are stored, a hard disk device 203, and a communication module 204 used for communication with external devices including the mobile terminal 10.

In the present exemplary embodiment, the semiconductor memory 202 is constituted by a ROM in which a BIOS and the like are stored and a RAM used as a first storage device. The CPU 201 and the semiconductor memory 202 constitute a computer. The CPU 201 uses the RAM as a program work space.

The hard disk device 203 is an auxiliary storage device in which an operating system and apps are stored. The apps include a program used to offer the AR service.

Furthermore, the hard disk device 203 according to the present exemplary embodiment stores therein, for example, a database used for detection of a subject included in an image taken by the mobile terminal 10 (see FIG. 1), translation, and the like and a model generated by machine learning.

The subject according to the present exemplary embodiment is a thing recognized as an object, for example, by artificial intelligence among things included in an image taken by the camera 106 (see FIG. 2) or text information. In other words, the subject according to the present exemplary embodiment is a target or a unit of processing with which AR content is associated. A relationship of association between AR content and a thing or the like is stored in the hard disk device 203.

Figure 5:
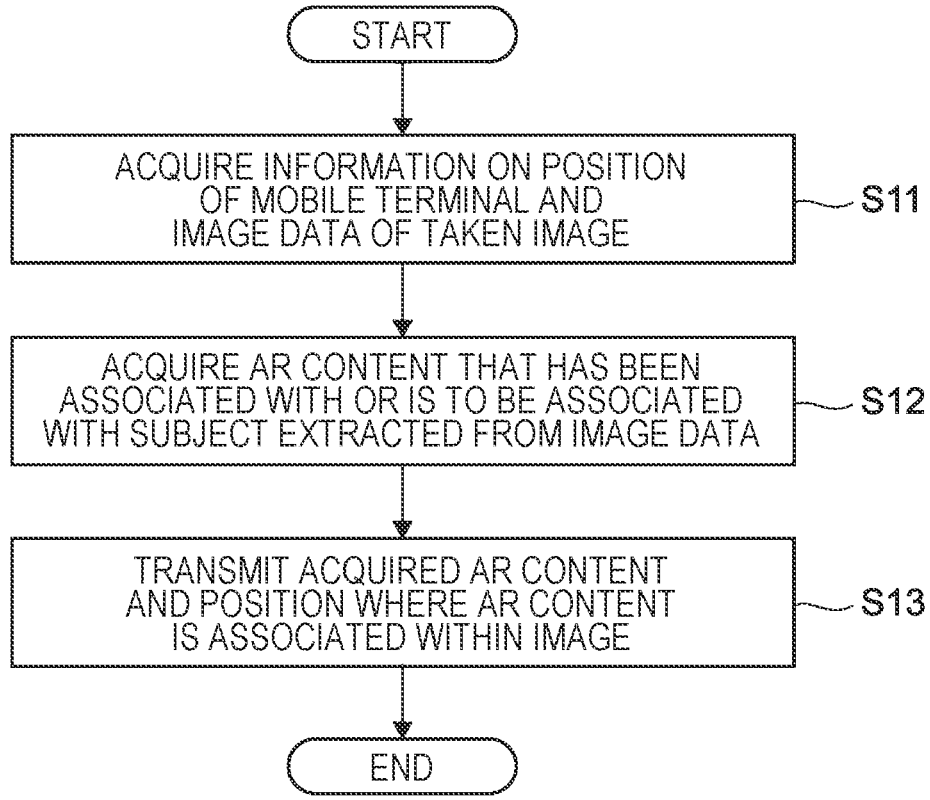
FIG. 5 is a flowchart for explaining an example of processing operation executed by the AR server that offers the AR service.

FIG. 5 is a flowchart for explaining an example of processing operation executed by the AR server 20 that offers the AR service. The processing illustrated in FIG. 5 is executed by the CPU 201 (see FIG. 4). Note that the symbol "S" in FIG. 5 represents a step.

The CPU 201 acquires information on a position of the mobile terminal 10 and image data of a taken image through communication with the mobile terminal 10 (see FIG. 1) that uses the AR service (step 11). In the present exemplary embodiment, the CPU 201 acquires information such as a position measured by the GPS module 104 (see FIG. 2).

In a case where the position of the mobile terminal 10 is known, accuracy of recognition of a subject is sometimes improved. Note, however, that in a case where a subject is characteristic, a position where the image is taken can be specified only from image data. In a case where the image contains unique building or landscape, the position of the mobile terminal 10 can be specified.

In a case where the AR service is translation of text information taken as a subject, information on a position where the subject is taken is unnecessary. That is, information on the position is not necessarily needed depending on the kind of AR service used by the user.

Although image data of images taken by the camera 106 (see FIG. 2) are uploaded from the mobile terminal 10 to the AR server 20 in the present exemplary embodiment, all of the image data may be uploaded or one every predetermined number of image data may be uploaded.

Alternatively, only some of image data extracted through preprocessing performed by the mobile terminal 10 may be uploaded from the mobile terminal 10 to the AR server 20 or information indicative of characteristics of an image extracted through preprocessing of the mobile terminal 10 may be uploaded from the mobile terminal 10 to the AR server 20.

In an environment in which 3G or 4G is used for communication between the mobile terminal 10 and the AR server 20, AR content can be offered in a shorter time by reducing an amount of uploaded information.

Next, the CPU 201 acquires AR content that has been associated or to be associated with a subject extracted from the image data (step 12) and transmits the acquired AR content and a position where the AR content associated within the image (step 13).

For example, in a case where the subject is a building or a natural object, information associated with the subject or retrieved information about the specified building or the like is transmitted as AR content. Meanwhile, in a case where the subject is text information, a text converted from the subject or translation of the subject is transmitted as AR content.

The CPU 201 transmits a position where the transmitted AR content is associated within the image.

Screen Examples

Screen examples in the first exemplary embodiment are described below with reference to FIGS. 6 through 14.

Screen Example 1

Figure 6A:
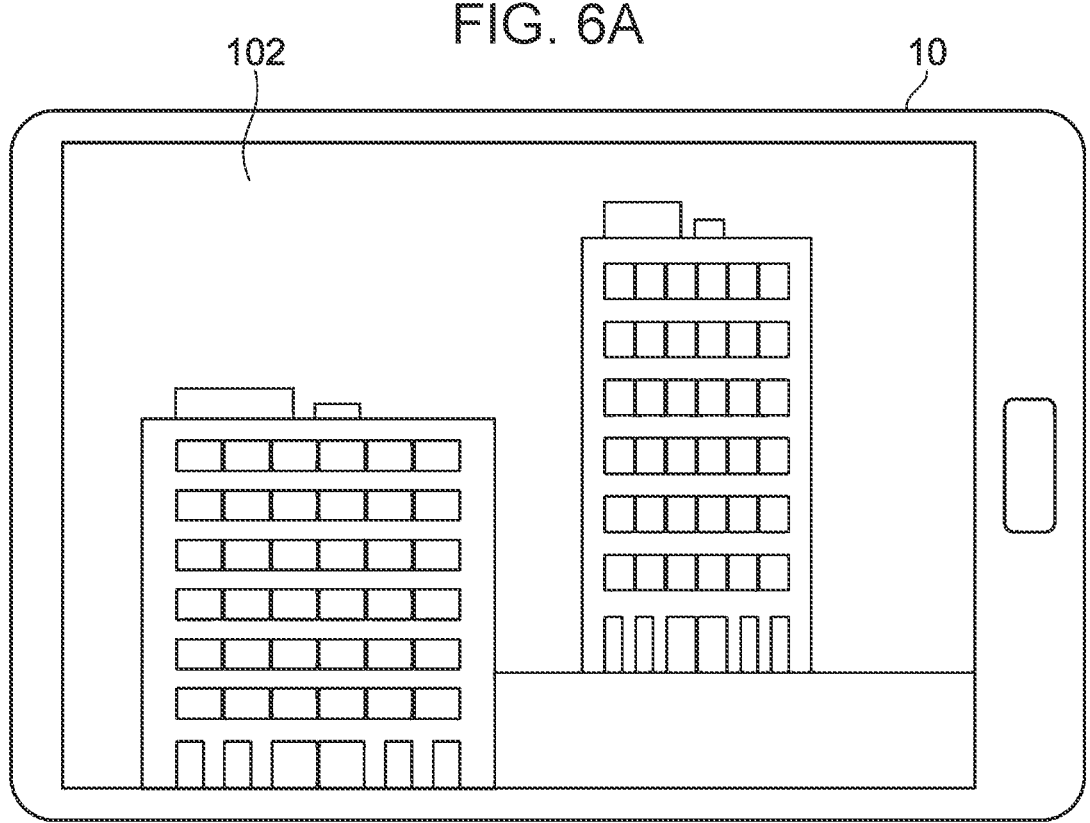
FIGS. 6A and 6B are views for explaining a difference between a screen before use of the AR service and a screen after use of the AR service.
Figure 6B:
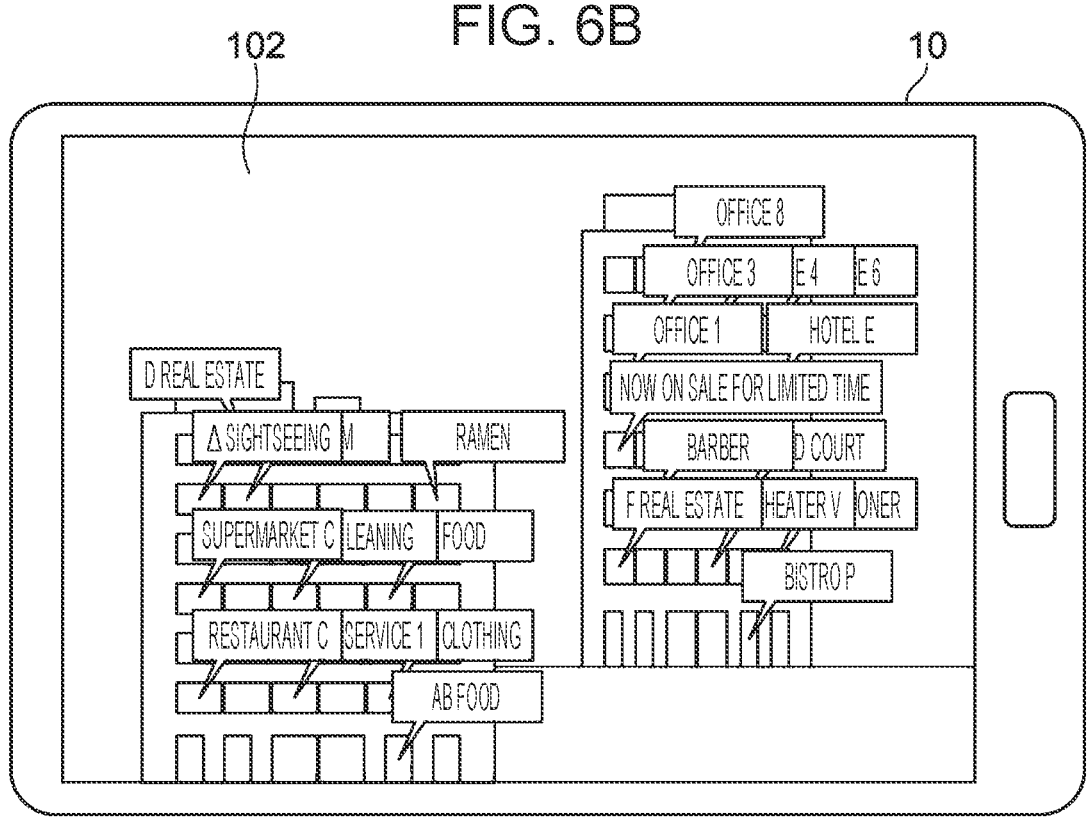

FIGS. 6A and 6B are views for explaining a difference between a screen before use of the AR service and a screen after use of the AR service. FIG. 6A illustrates an example of a screen before use of the AR service, and FIG. 6B illustrates an example of a screen after use of the AR service.

In FIGS. 6A and 6B, two buildings are displayed on the display 102 before use of the AR service. Meanwhile, AR content associated with the two buildings is displayed in association with specific parts of the buildings on the display 102 after start of use of the AR service.

In FIG. 6B, the AR content is displayed in a balloon manner so as to overlap a taken image. The balloon may be non-transparent or may be transparent. The "transparent" means that a part behind the balloon is visible through the balloon, and the "non-transparent" means that a part behind the balloon is invisible through the balloon. A vertex of a triangle of the balloon indicates a subject or a position with which AR content is associated.

In FIG. 6B, a lot of pieces or AR content are associated with both of a building on a near side and a building on a far side. The building on a near side is closer to the mobile terminal 10 than the building on a far side. In FIG. 6B, all of associated pieces of AR content are displayed within the screen.

In FIG. 6B, the number of displayed pieces of AR content is large, and displayed positions overlap one another. For this reason, viewability of displayed AR content is low. There is a possibility that even existence of AR content behind other AR content may be unnoticed.

As described above, the number of pieces of AR content associated with a single object will increase in the future as the quality of services improves.

Figure 7A:
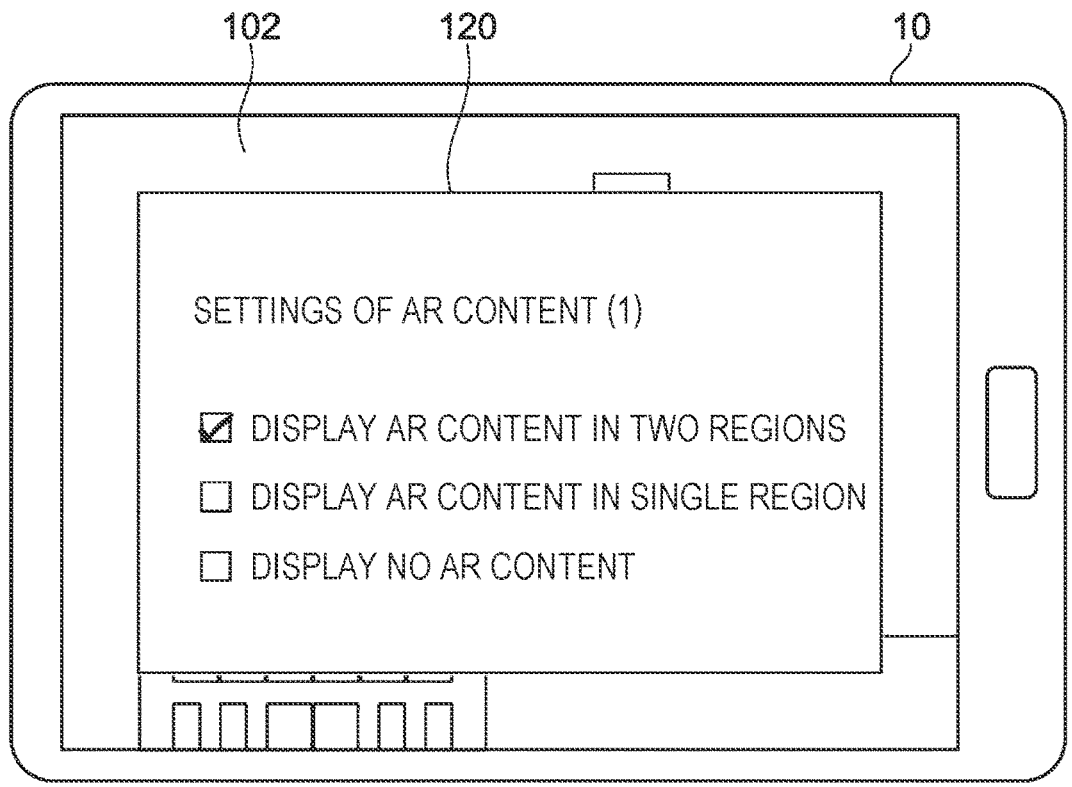
FIGS. 7A and 7B illustrate an example of a screen used for display settings of AR content.
Figure 7B:
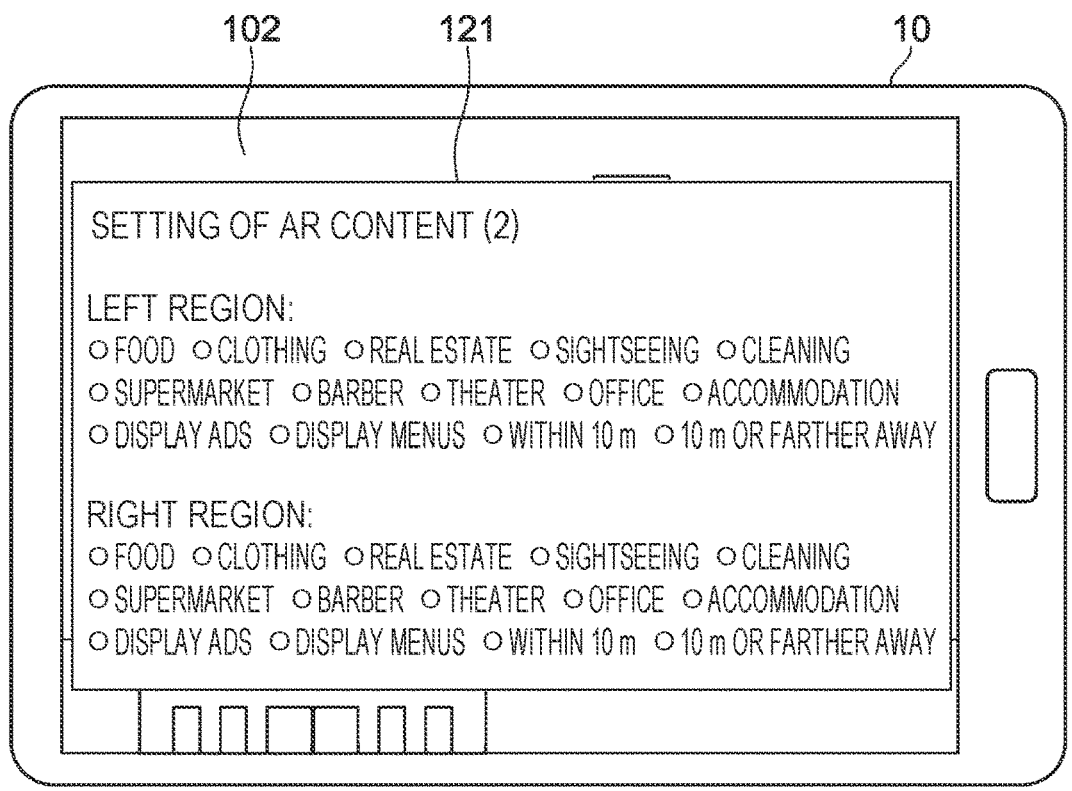

FIGS. 7A and 7B illustrate an example of a screen used for display settings of AR content. FIG. 7A illustrates an example of a screen 120 used to designate whether or not to display AR content, and FIG. 7B illustrates an example of a screen 121 used to designate what kind of AR content is to be displayed.

In the present exemplary embodiment, the screen 120 is displayed, for example, when a setting button (not illustrated) or a specific position is tapped. On the screen 120, three options are displayed. The three options are a mode for displaying AR content in two regions, a mode for displaying AR content in a single region, and a mode for displaying no AR content.

The mode for displaying AR content in a single region is a mode for displaying an image taken by the mobile terminal 10 and AR content associated with a subject within the image on the display surface as illustrated in FIG. 6B. In this case, a region where the image is displayed matches the display surface of the display 102.

The mode for displaying AR content in two regions is a mode for displaying an image taken by the mobile terminal 10 and AR content related to a subject within the image in two regions within the display surface, respectively. In the present exemplary embodiment, the display surface is divided into left and right regions that have the same size.

The mode for displaying no AR content is a mode for displaying only an image taken by the mobile terminal 10 on the display 102 as illustrated in FIG. 6A.

In the case of the screen 120, a checkbox corresponding to the mode for displaying AR content in two regions has been checked. Accordingly, the screen 121 is used to set AR consent to be displayed in left and right two regions.

On the screen 121, options concerning AR content to be displayed in the left and right two regions are displayed. Hereinafter, a region on a left side of the display surface is referred to as a "left region", and a region on a right side of the display surface is referred to as a "right region".

In FIG. 7, "FOOD", "CLOTHING", "REAL ESTATE", "SIGHTSEEING", "CLEANING", "SUPERMARKET", "BARBER", "THEATER.", "OFFICE", "ACCOMMODATION", "DISPLAY ADS", "DISPLAY MENUS", "WITHIN 10 M", and "10 M OR FARTHER AWAY" are displayed as options for the left region and options for the right region. The options illustrated in FIG. 7B are an example, and other options may be used. For example, the options may include information on means of transportation such as train stations and bus stops.

Among the options, "FOOD", "CLOTHING", "REAL ESTATE", "SIGHTSEEING", "CLEANING", "SUPERMARKET", "BARBER", "THEATER", "OFFICE", and "ACCOMMODATION" are examples of kinds of subjects and are examples of standards used to determine which AR content is to be displayed.

Among the options, "DISPLAY ADS", "DISPLAY MENUS", "WITHIN 10 M", and "10 M OR FARTHER AWAY" are examples of standards used to determine which AR content is to be displayed.

These options may be given irrespective of a taken image or may be given in accordance with a taken image. In the present exemplary embodiment, the AR server 20 recognizes a subject included in a taken image. Note, however, that the mobile terminal 10 may recognize a subject.

The option. "DISPLAY ADS" is an option for causing advertisements, which are subcontent, to be included in AR content.

The option "DISPLAY MENUS" is an option for causing menus to be included in AR content.

The option "WITHIN 10 M" is an option for restricting displayed AR content to AR content of subjects within 10 m from the mobile terminal 10 in a direction in which the image is taken.

The option "10 M OR FARTHER AWAY" is an option for restricting displayed AR content to AR content of subjects that are 10 m or farther away from the mobile terminal 10 in a direction in which the image is taken. A distance to a subject may be a rough value.

For example, in a case where a position of a subject is registered in the AR server 20, a distance between the mobile terminal 10 and the subject can be calculated by using information on a position measured by the mobile terminal 10. In a case where the mobile terminal 10 is provided with a module for Light Detection and Ranging (LiDAR) or in a case where the mobile terminal 10 has an app for measuring a distance to a subject on the basis of a taken image, the distance to the subject can be measured by the mobile terminal 10 alone.

Although two standards ("WITHIN 10 M" and "10 M OR FARTHER AWAY") are prepared as standards concerning a distance and no upper limit is set in FIG. 7B, an upper limit may be set in a case where the number of displayed pieces of AR content is large. For example, an option "FROM 10 M TO 30 M" may be prepared.

Note that, the threshold value "10 M" is merely an example, and one or more other threshold values may be used. Furthermore, a distance that gives a displayed range may be changed or designated by a user.

Settings using the screen 120 and the screen 121 illustrated in FIGS. 7A and 7B may be used only to specify AR content displayed by the mobile terminal 10 or may be used to read out AR content by the AR server 20.

In the former case, the mobile terminal 10 uses the above settings for selection of AR content to be displayed on the regions from among AR content given by the AR server 20.

In the latter case, the AR server 20 uses the above settings for selection of AR content that satisfies a standard designated by the user. In this case, the AR server 20 gives only selected AR content to the mobile terminal 10, and the mobile terminal 10 causes the given AR content to be displayed in a corresponding region.

AR content to be displayed on the display 102 is designated by the user in the present exemplary embodiment, AR content to be displayed on the display 102 may be decided in accordance with a subject within an image by the AR server 20.

Screen Example 2

Figure 8:
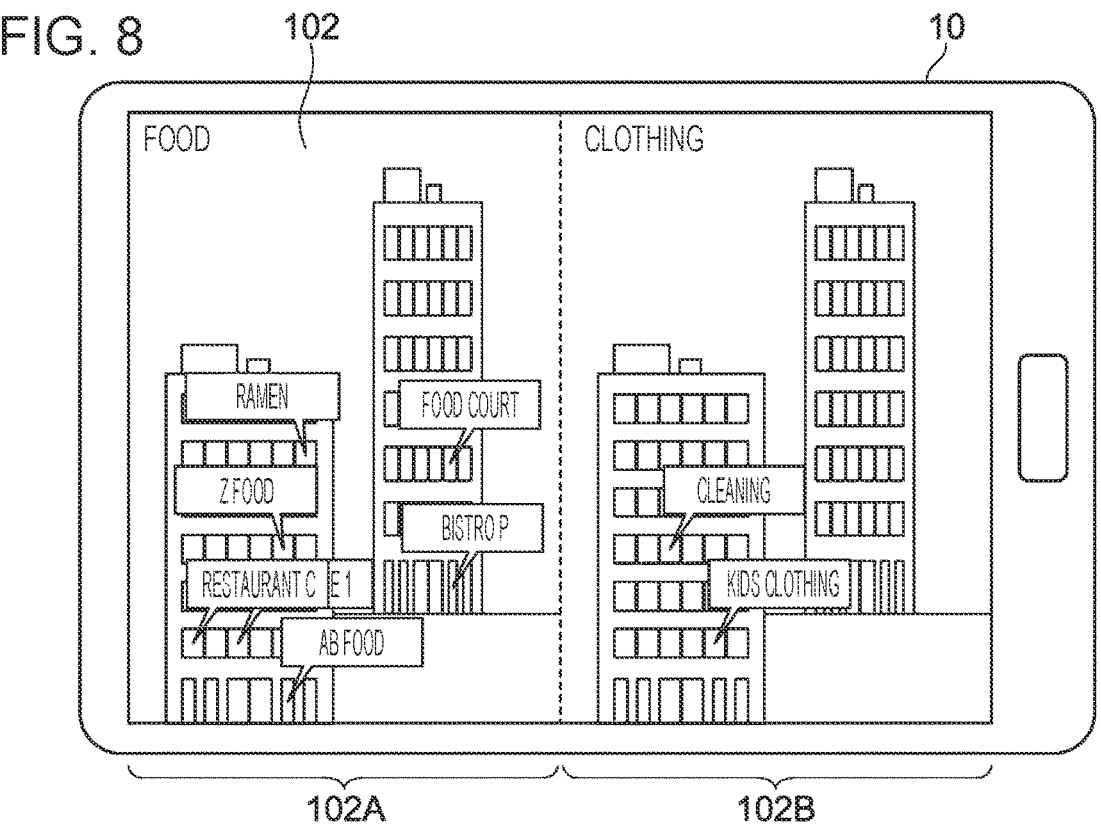
FIG. 8 is a view for explaining an example of a screen displayed in a case where AR content is displayed in two regions.

FIG. 8 is a view for explaining, an example of a screen displayed in a case where AR content is displayed in two regions. In FIG. 8, parts corresponding to those in FIGS. 6A and 6B are given corresponding reference signs.

In FIG. 8, the display surface of the display 102 is divided into a left region 102A and a right region 102B, and the same image taken by the camera 106 (see FIG. 2) is displayed in these regions. Preset AR content is displayed in the left region 102A and the right region 102B.

In FIG. 8, AR content related to food is selectively displayed in the left region 102A, and AR content related to clothing is selectively displayed in the right region 102B.

In FIG. 8, both of the size of the left region 102A and the size of the right region 102B are ½ of the display 102. Accordingly, the sizes of images displayed in the left region 102A and the right region 102B are smaller than the size of image in the screen example of FIGS. 6A and 6B.

Meanwhile, the number of pieces of AR content displayed over the image in the left region 102A and the number of pieces of AR content displayed over the image in the right region 102B are smaller than that in FIG. 6B. This reduces overlapping among pieces of AR content, thereby improving viewability.

Although viewability of AR content is improved in the case of FIG. 8 as compared with the case of FIG. 6B, it may be desirable to further improve viewability of noteworthy AR content.

Figure 9:
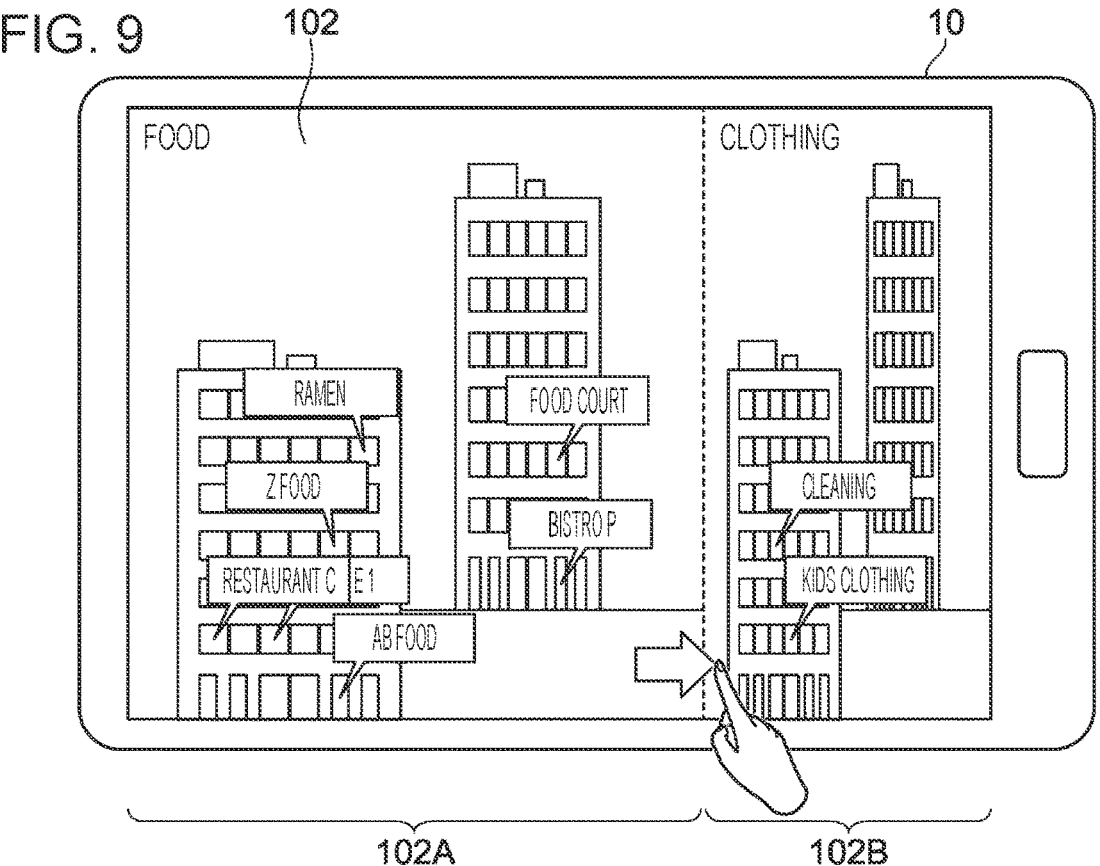
FIG. 9 is a view for explaining an example in which sizes of two regions in which the same image is displayed are changed.

FIG. 9 is a view for explaining an example in which sizes of two regions in which the same image is displayed are changed. In FIG. 9, parts corresponding to those in FIG. 8 are given corresponding reference signs.

In the screen example illustrated in FIG. 9, a boundary between the left region 102A and the right region 102B is moved rightward by a fingertip. As a result, the size of the left region 102A becomes wider than that in FIG. 8, and the size of the right region 102B becomes narrower than that in FIG. 8.

In FIG. 9, in the left region 102A, overlapping among pieces of AR content is reduced, and viewability is further improved. Improvement of viewability of AR content in FIG. 9 is also apparent from a comparison with FIG. 6B.

Although viewability of AR content in the right region 102B whose size becomes narrower may decrease in FIG. 9 as compared with FIG. 6B, influence is small since the right region 102B is not a region observed by a user.

Screen Example 3

Figure 10:
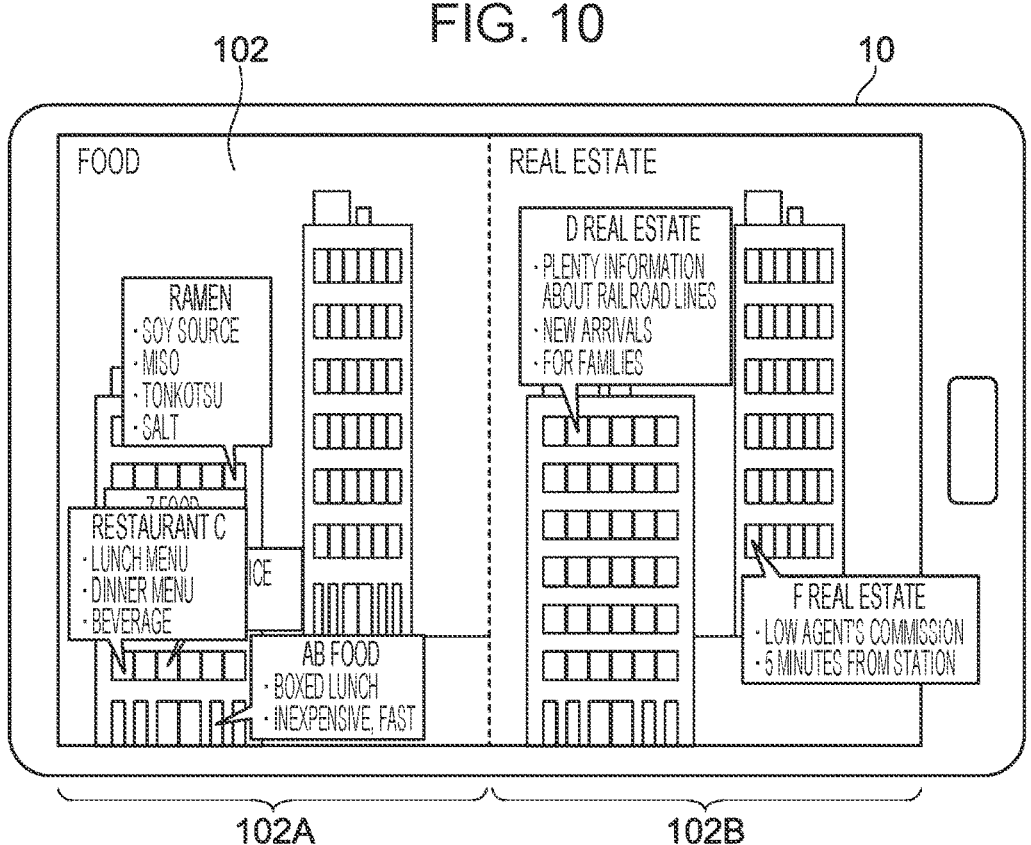
FIG. 10 is a view for explaining an example a screen displayed in a case where settings for causing advertisements to be included in AR content are made.

FIG. 10 is a view for explaining an example of a screen displayed in a case where settings for causing advertisements to be included in AR content are made. In FIG. 10, parts corresponding to those in FIG. 8 are given corresponding reference signs.

In FIG. 10, AR content is displayed in each of left and right two regions on the display 102. In FIG. 10, AR content related to food is selectively displayed in the left region 102A, and AR content related to real estate is selectively displayed in the right region 102B.

In the left region 102A illustrated in FIG. 10, information on menus is added. Addition of the information on menus allows a user to view not only restaurant names and kinds of food, but also menus.

In the right region 102B illustrated in FIG. 10, information on handled property and information on advertisements are added. Addition of the information on advertisements allows a user to check not only shop names, but also information on characteristics of shops.

The menus and advertisements displayed as AR content are registered in the AR server 20.

These pieces of information are, for example, registered by shops in advance, registered by a provider of the AR service in advance, registered by a user of the AR service, or collected from the Internet.

Screen Example 4

Figure 11:
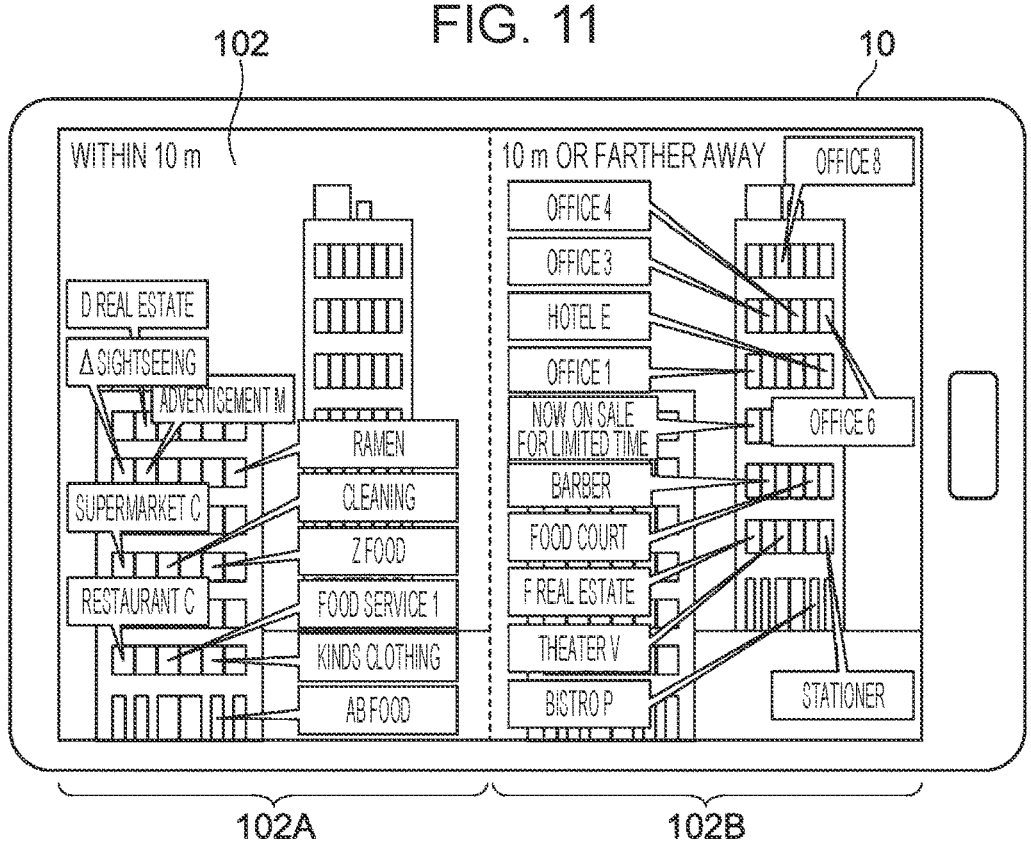
FIG. 11 is a view for explaining an example of a screen displayed in a case where AR content to be displayed in two regions is set depending on a distance in a direction in which an image is taken.

FIG. 11 is a view for explaining an example of a screen displayed in a case where AR content displayed in two regions is set depending on a distance in a direction in which an image is taken. In FIG. 11, parts corresponding to those in FIG. 8 are given corresponding reference signs.

Also in FIG. 11, AR content is displayed in each of left and right two regions on the display 102.

In FIG. 11, AR content associated with a subject within 10 m from the mobile terminal 10 is selectively displayed in the left region 102A, and AR content associated with a subject located 10 m or farther away from the mobile terminal 10 is selectively displayed in the right region 102B.

In FIG. 11, AR content associated with tenants located in a building on a near side of two buildings is displayed in the left region 102A, and AR content associated with tenants located in a building on a far side of the two buildings is displayed in the right region 102B.

Figure 12A:
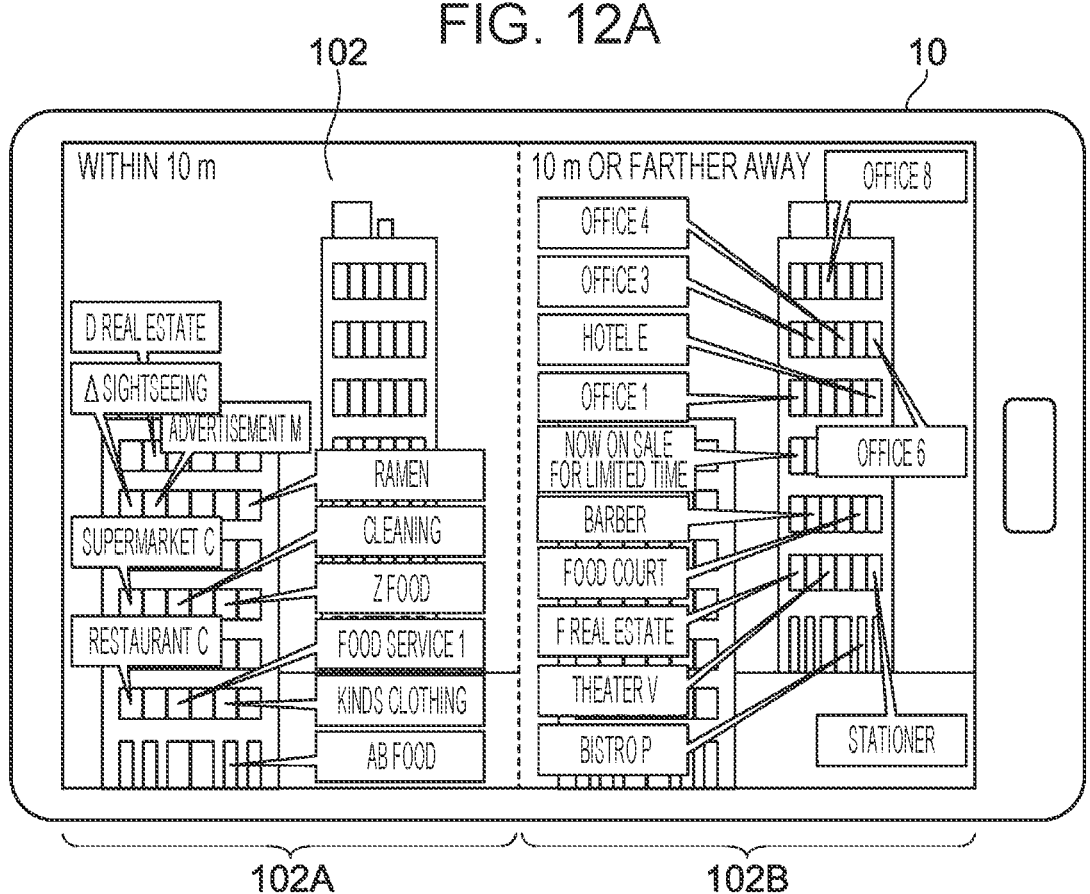
FIGS. 12A and 12B are views for explaining an example of a screen displayed in a case where a communication environment changes during use of the AR service.
Figure 12B:
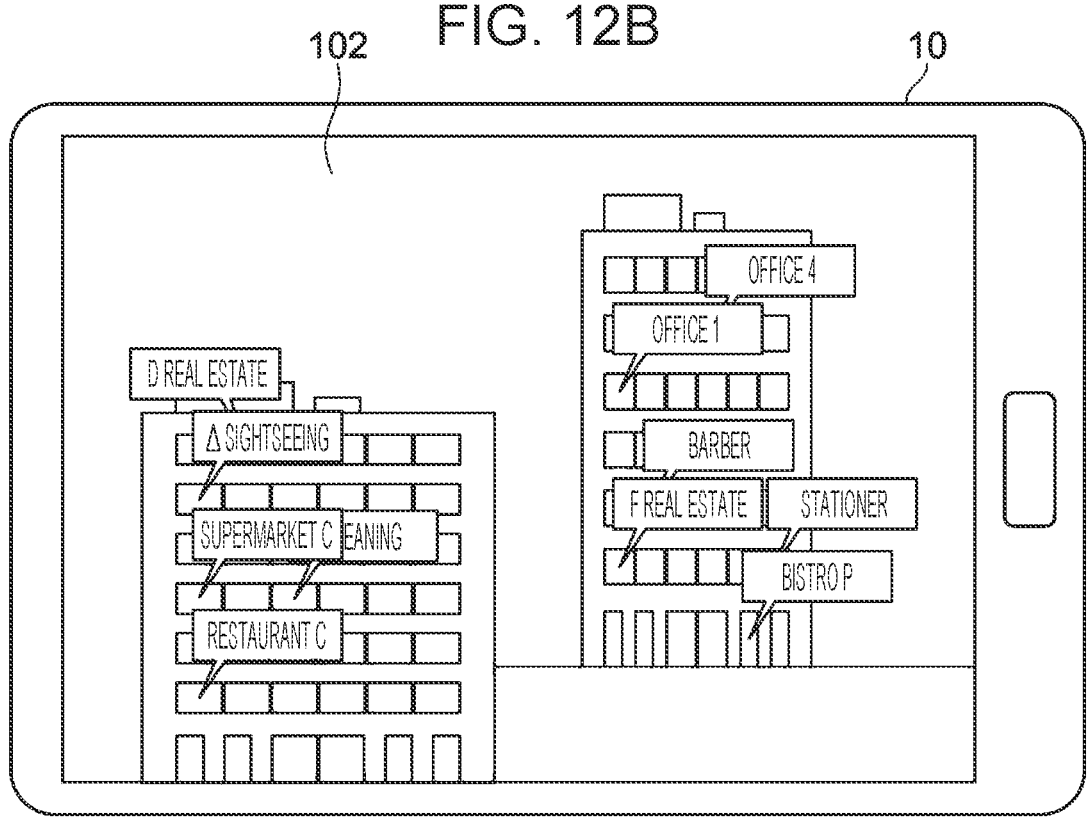

FIGS. 12A and 12B are views for explaining an example of a screen displayed in a case where a communication environment changes during use of the AR service. FIG. 12A illustrates a case where 5G communication whose communication speed is relatively high is available, and FIG. 12B illustrates a case where 4G communication whose communication speed is relatively low is available.

In a case where 5G communication, which allows a user to transmit and receive a large volume of data without perceiving a delay, is available, an image taken by the camera 106 (see FIG. 2) and corresponding AR content are displayed in the left and right two regions of the mobile terminal 10 without delay.

Meanwhile, when communication switches from 5G to 4G, the mobile terminal 10 switches to a mode for displaying AR content in a single region. Furthermore, the mobile terminal 10 limits the number of displayed pieces of AR content.

By setting a limit on the number of displayed pieces of AR content, the AR content can follow the taken image better.

In the case of 4G communication, the number of pieces of AR content displayed on the display 102 is limited to a predetermined threshold value or less. The threshold value may be set by an individual user. A threshold value to which the number of displayed pieces of AR content is limited may vary depending on displayed AR content.

The number of displayed pieces of AR content may be set in advance or may be set by a user.

AR content displayed after switching to 4G communication may be random, may be limited to one for each kind, or may be limited to AR content of a specific kind. This also can be set by a user.

Screen Example 5

Figure 13A:
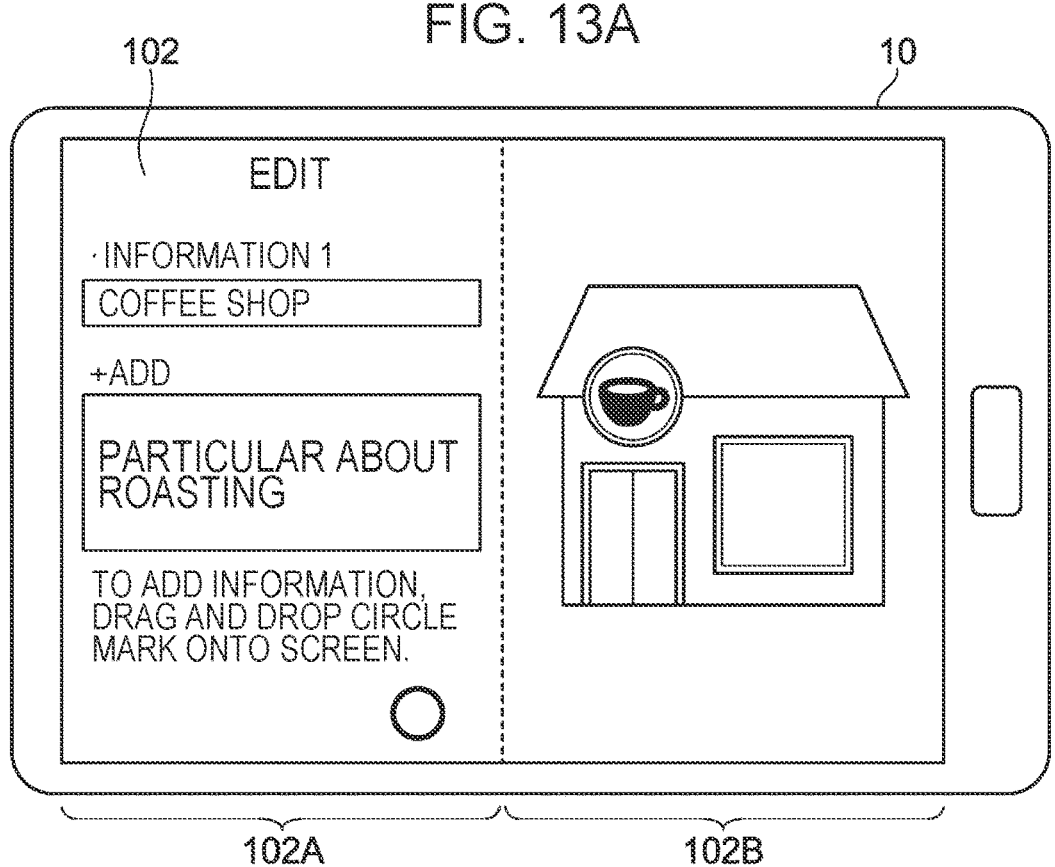
FIGS. 13A and 13B are views for explaining an example of a screen used by a user to edit AR content.
Figure 13B:
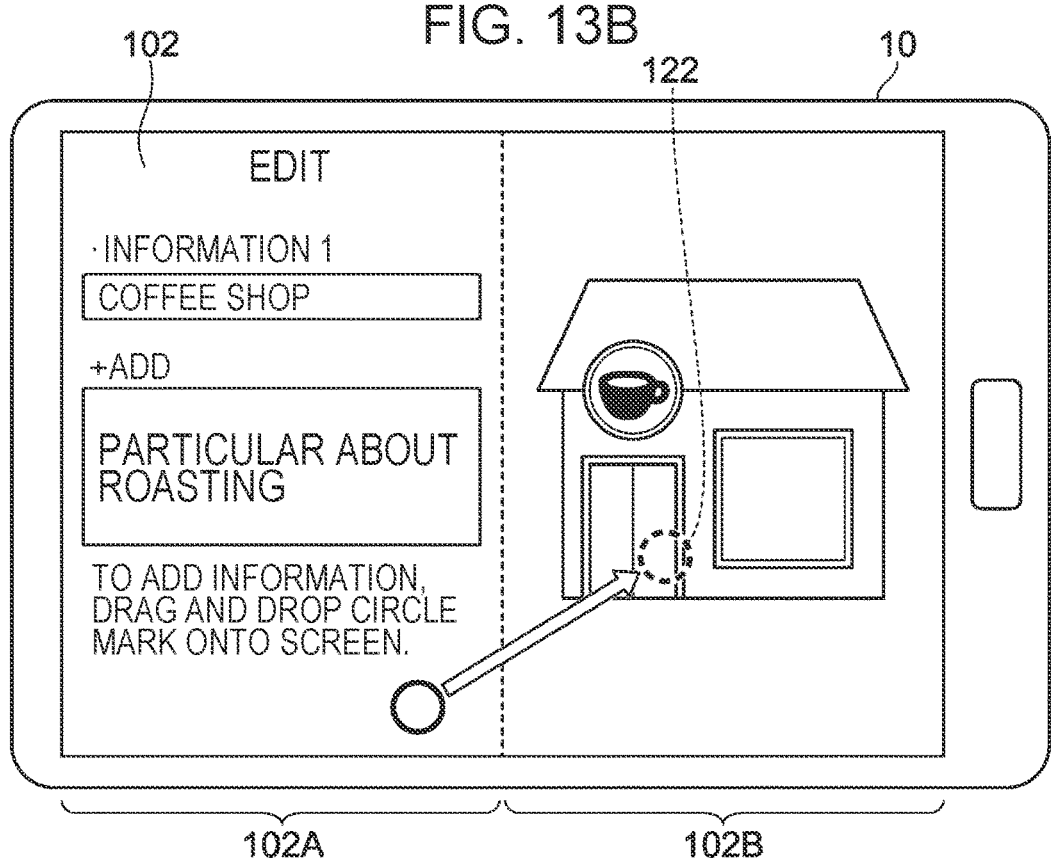

FIGS. 13A and 13B view for explaining an example of a screen used in a case where a user edits AR content. FIG. 13A illustrates an example of a screen (hereinafter referred to as an "edit screen") used to edit a comment on a subject, and FIG. 13B illustrates an example of an action for associating a comment with a specific position on a subject.

The "edit" includes new registration. The screen illustrated in FIG. 13A is displayed, for example, when a user presses a specific subject displayed on the display 102 for a long time. In FIGS. 13A and 13B, an image of a coffee shop is designated as a target to be edited from among images displayed on the display 102.

On the edit screen, a screen for receiving entry of a comment is displayed in the left region 102A of the display 102, and an enlarged image of a subject with which the comment is to be associated is displayed in the right region 102B. The edit screen is an example of information used for setting of AR content associated with a subject.

In FIGS. 13A and 13B, "COFFEE SHOP" is entered as a type of subject, and a comment "PARTICULAR ABOUT ROASTING" is entered as additional information.

In the present exemplary embodiment, the entered comment can be associated not with an entire subject but with a specific position of the subject. In the example of FIG. 13B, a circle mark is dragged and dropped onto a door of an entrance of a coffee shop, as indicated by the arrow. Note that the circle mark may be dragged and dropped onto a window on the right side or the circle mark may be dragged and dropped onto a roof.

Information on a comment on a subject entered by the mobile terminal 10 and a position where the comment is associated is sent from the mobile terminal 10 to the AR server 20 and is stored in the AR server 20. The comment is given as AR content from the AR server 20 to the mobile terminal 10.

In a case where plural pieces of AR content are registered for a single subject, overlap among these pieces of AR content results in low user's viewability.

In view of this, in the present exemplary embodiment, the mobile terminal 10 is provided with a function for improving viewability of AR content.

Figure 14:
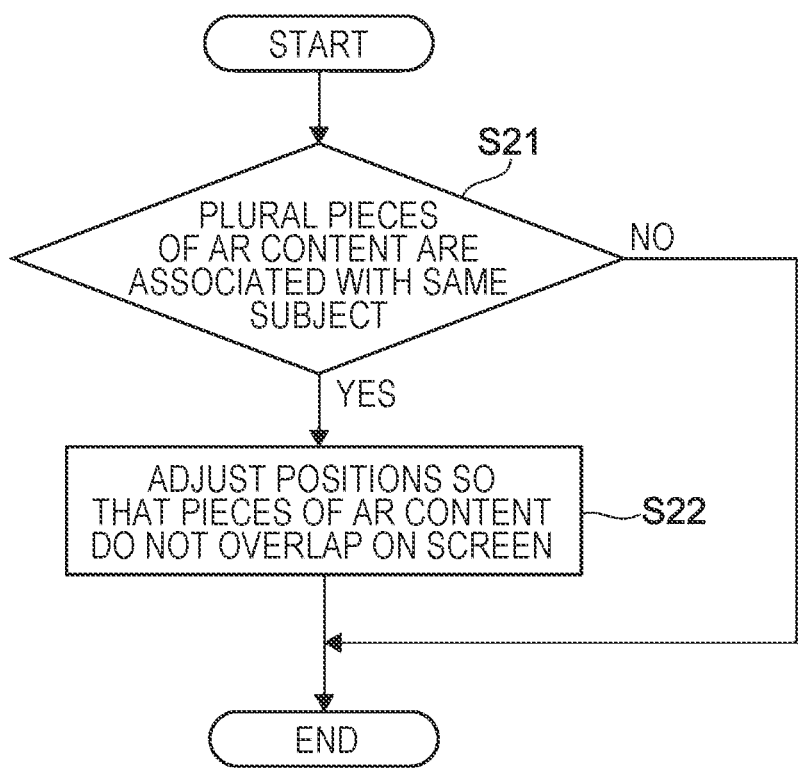
FIG. 14 is a flowchart for explaining an example of processing for increasing viewability of AR content in a case where plural pieces of AR content are associated with a single subject.

FIG. 14 is a flowchart for explaining an example of processing for improving viewability of AR content in a case where plural pieces of AR content are associated with single subject. The processing illustrated in FIG. 14 is executed by the CPU 101 (see FIG. 2) of the mobile terminal 10 (see FIG. 1). Note that the symbol "S" in FIG. 14 represents a step.

The CPU 101 determines whether or not plural pieces of AR content are associated with the same subject when acquiring AR content from the AR server 20 (see FIG. 1) (step 21). In the present exemplary embodiment, users who edited AR content are not distinguished from one another. In other words, the same mobile terminal 10 need not be used to edit AR content.

In the present exemplary embodiment, AR content registered by a user of the AR service is shared among plural users using the same service. Note, however, that displayed AR content may be managed for each user and AR content edited by other users may be excluded from displayed AR content.

In a case where a positive result is obtained in step 21, the CPU 101 adjusts positions of the plural pieces of AR content so that the plural pieces of AR content do not overlap one another on the screen (step 22). This processing improves viewability of AR content. Note that the adjustment of the positions depends on the size of the display 102 of the mobile terminal 10. The larger the size is, the easier reduction of overlap among the plural pieces of AR content is.

In a case where no AR content or only a single piece of AR content is associated with a single subject, the CPU 101 obtains a negative result in step 21. In this case, the CPU 101 does not adjust a position of the AR content.

Second Exemplary Embodiment

Examples of Configurations of System and Device

Figure 15:
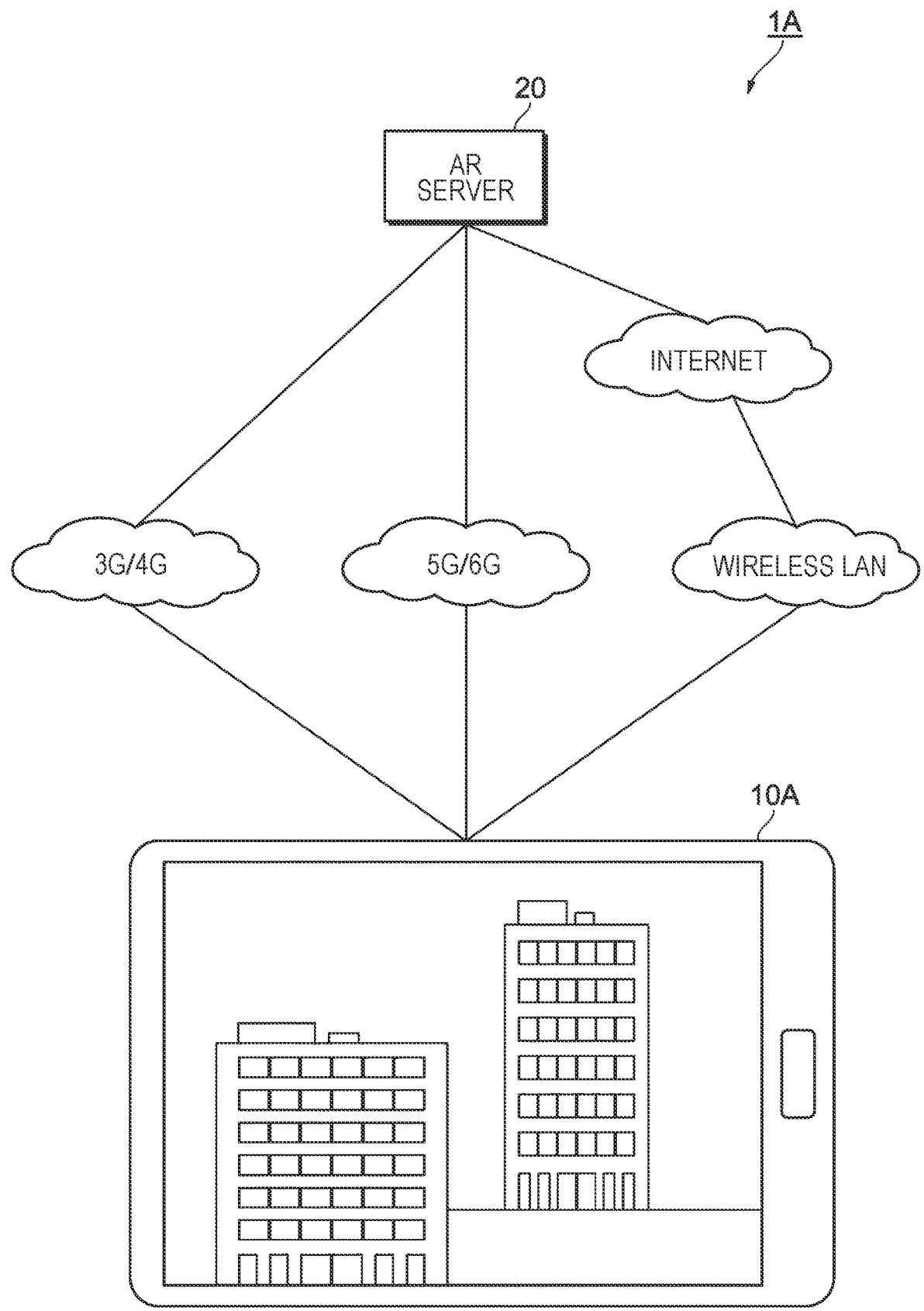
FIG. 15 illustrates an example of a configuration of a network system used in an AR service intended in the second exemplary embodiment.

FIG. 15 illustrates an example of a configuration of a network system 1A used in an AR service intended in the second exemplary embodiment. In FIG. 15, parts corresponding to those in FIG. 1 are given corresponding reference signs.

In the network system 1A according to the present exemplary embodiment, a mobile terminal 10A whose display surface is deformable is connected to an AR server 20.

FIGS. 16A and 16B are views for explaining an example of an outer configuration of the mobile terminal 10A used in the second exemplary embodiment. FIG. 16A is a front view of the mobile terminal 10A, and FIG. 16B is a side view of the mobile terminal 10A.

A body 11 of the mobile terminal 10A has two body panels 11A and 11B and a hinge 12. The two body panels 11A and 11B are connected to each other with the hinge 12 interposed therebetween. The hinge 12 is an example of a bending part. The hinger 12 is located so as to divide the display 102 into halves in a longitudinal direction. In FIGS. 16A and 16B, the longitudinal direction of the display 102 is a y-axis direction, and a lateral direction of the display 102 is an x-axis direction.

Although the hinge 12 is illustrated as an example of a bending part in the present exemplary embodiment, the bending part may be, for example, a deformable material such as plastic, a resin, or rubber or connecting fitting constituted by movable components.

The hinge 12 used in the present exemplary embodiment can be bent so that a surface on which the display 102 is provided becomes a ridge side. The display 102 and a film sensor 103 used in the present exemplary embodiment are made of a foldable material. The display 102 and the film sensor 103 are, for example, provided on a film-shaped plastic substrate.

Figure 17A:
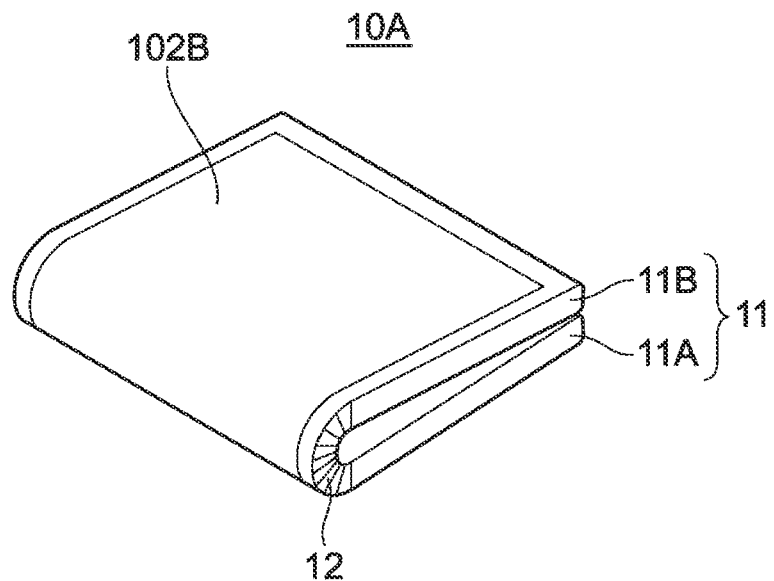
FIGS. 17A and 17B are views for explaining folding deformation of the mobile terminal used in the second exemplary embodiment.
Figure 17B:
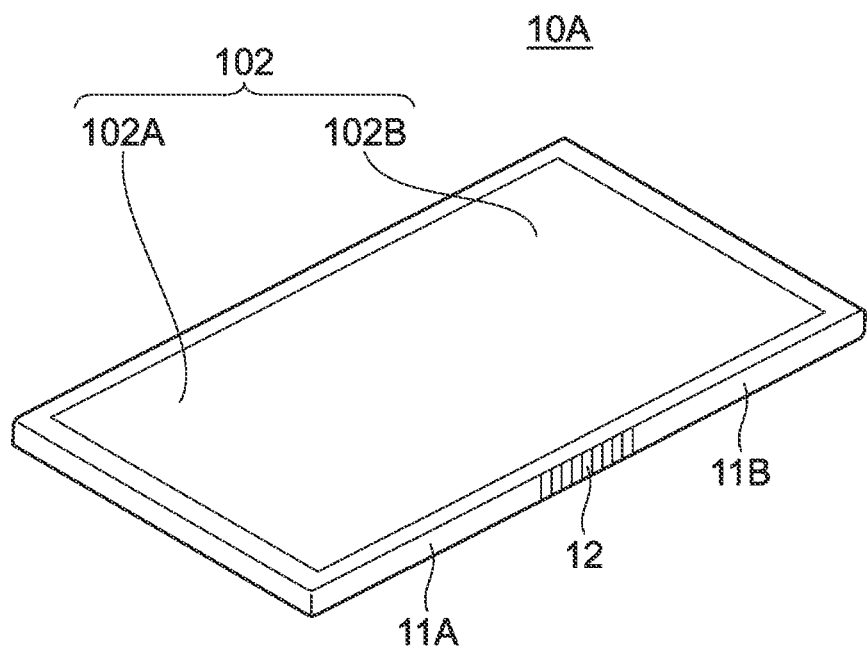

FIGS. 17A and 17B are views for explaining a folding deformation of the mobile terminal 10A used in the second exemplary embodiment. FIG. 17A illustrates an example of outer appearance of the mobile terminal 10A that has been folded, and FIG. 17B illustrates an example of outer appearance of the mobile terminal 10A that has not been folded yet.

In the present exemplary embodiment, deformation of the outer shape of the mobile terminal 10A is associated with display settings of AR content illustrated in FIG. 7A.

Specifically, the unfolded shape of the mobile terminal 10A is associated with the mode for displaying AR content in a single region, and the folded shape of the mobile terminal 10A is associated with the mode for displaying AR content in two regions.

In the present exemplary embodiment, a left side and a right side of the 102 with respect to the position of the hinge 12 are a left region 102A and a right region 102B, respectively.

Figure 18:
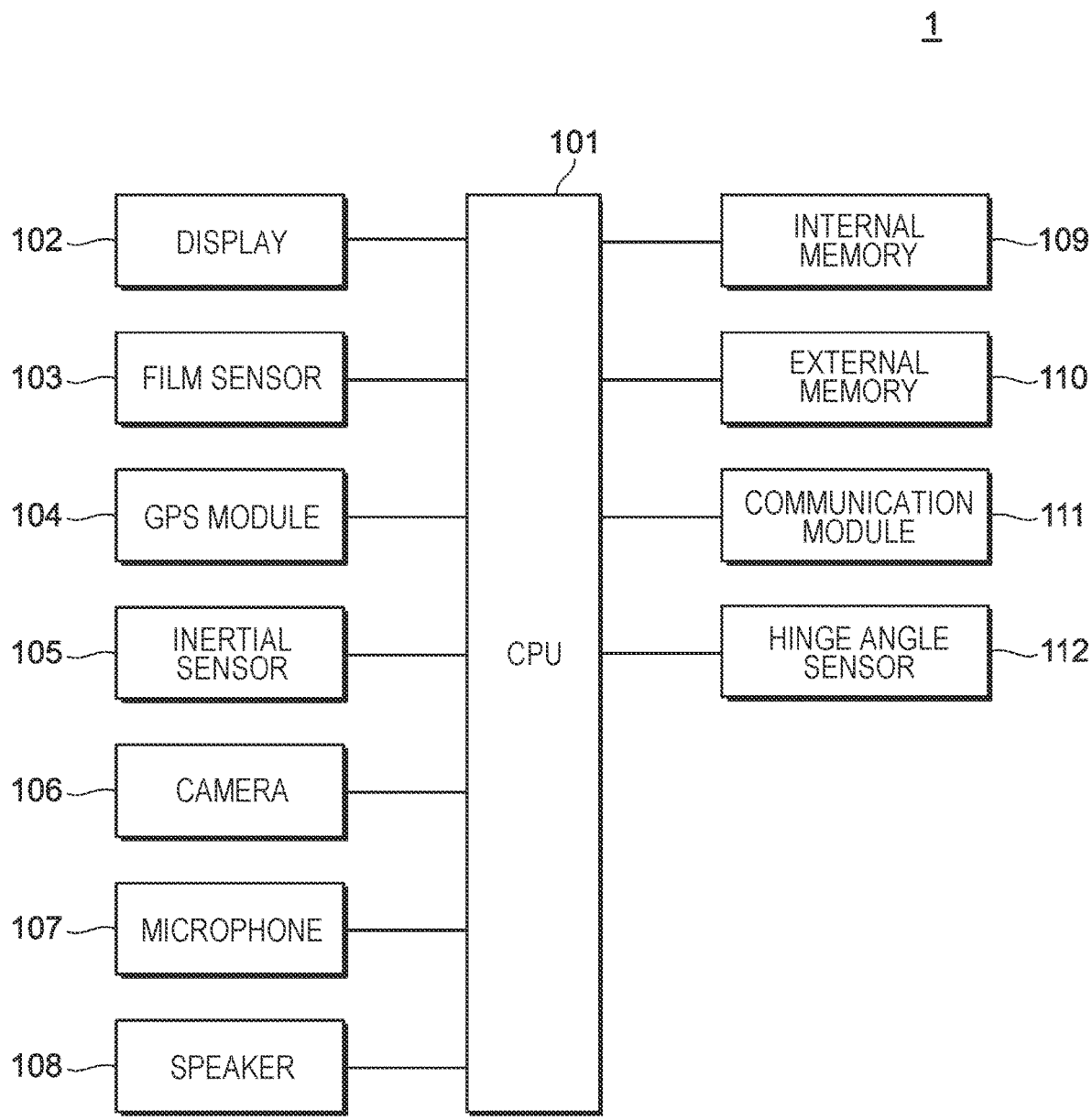
FIG. 18 is a view for explaining an example of a hardware configuration of the mobile terminal used in the second exemplary embodiment.

FIG. 18 is a view for explaining an example of a hardware configuration of the mobile terminal 10A used in the second exemplary embodiment. In FIG. 18, parts corresponding to those in FIG. 2 are given corresponding reference signs.

The mobile terminal 10A illustrated in FIG. 18 further has a hinge angle sensor 112. The hinge angle sensor 112 outputs information on an angle formed between the body panel 11A and the body panel 11B in a case where the body 11 (see FIG. 17) is deformed along the hinge 12. In other words, the hinge angle sensor 112 outputs a bending angle. The hinge angle sensor 112 may output the number of rotations, a rotation angle, or the like of a gear that constitutes the hinge 12 as information indicative of a bending angle.

Screen Examples

Screen examples according to the second exemplary embodiment are described below with reference to FIGS. 19 through 24.

Screen. Example 1

Figure 19A:
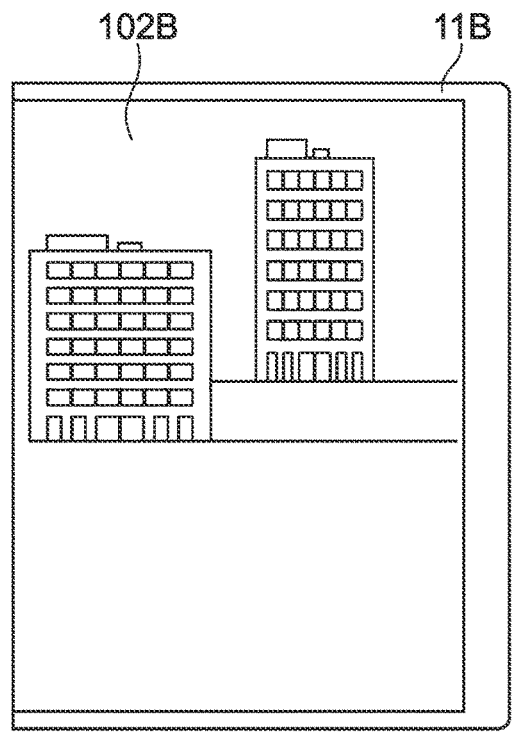
FIGS. 19A and 19B are views for explaining deformation of the mobile terminal and a change of a displayed screen.
Figure 19B:
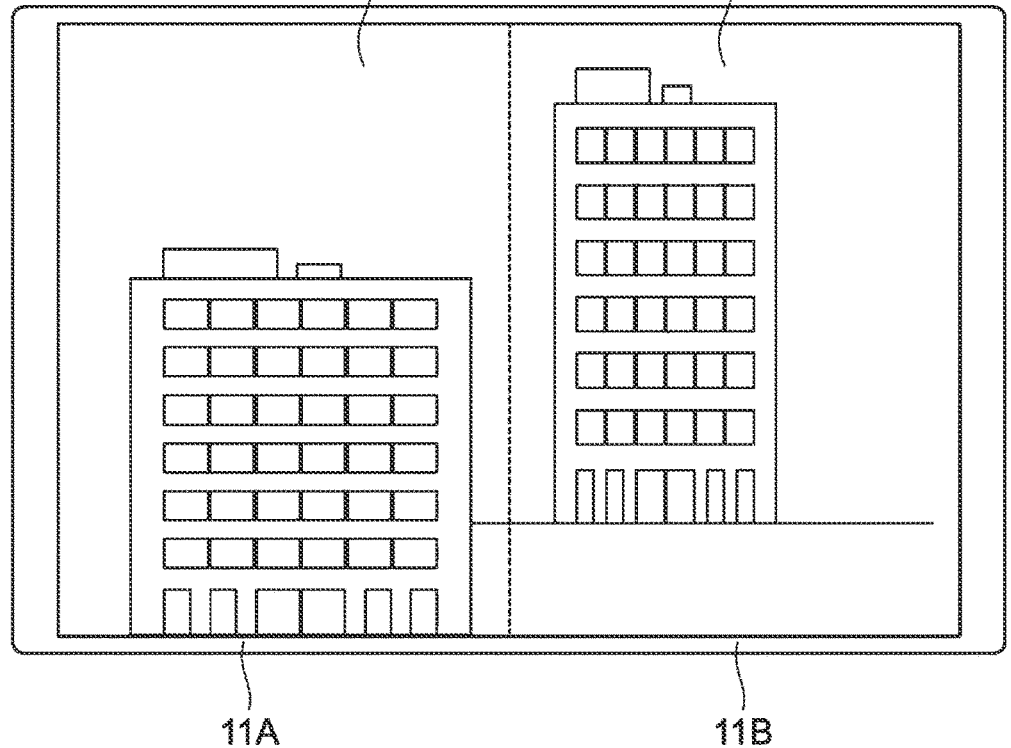

FIGS. 19A and 19B are views for explaining deformation or the mobile terminal 101 and a change or a displayed screen FIG. 19A illustrates an example of a screen displayed in a state where the display 102 is folded into halves, and FIG. 19B illustrates an example of a screen displayed in a state where the display 102 is unfolded.

The shape of FIG. 19A corresponds to the shape of FIG. 17A, and the shape of FIG. 19B corresponds to the shape of FIG. 17B.

The example illustrated in FIGS. 19A and 1910 shows a change of a display surface in a case where AR service is not used. In FIGS. 19A and 19B, a size of an image displayed on the display 102 changes in accordance with an area of a display surface viewed by a user. Specifically a size of an image displayed in the folded state is smaller than a size of an image displayed in the unfolded state. In other words, the display surface is enlarged by unfolding the display 102, and the display surface is reduced by folding the display 102. In this screen example, only a size of an image changes in accordance with deformation of the mobile terminal 10A.

Screen Example 2

Figure 20A:
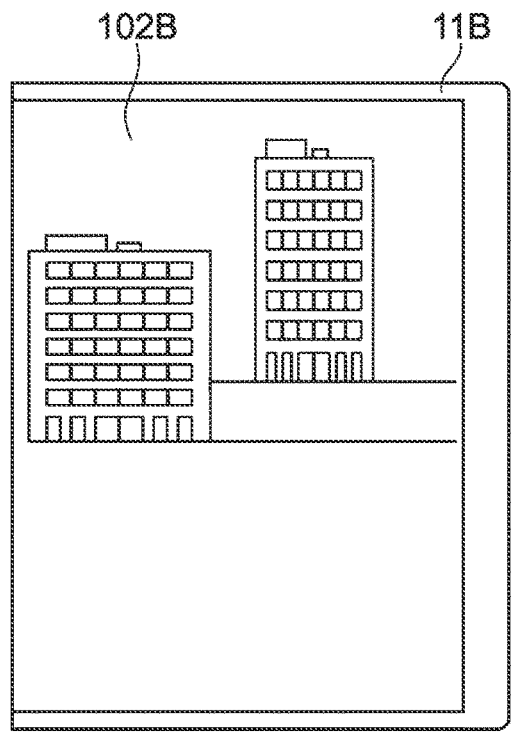
FIGS. 20A and 20B are views for explaining a case where whether or not to display AR content is associated with deformation of the mobile terminal.
Figure 20B:
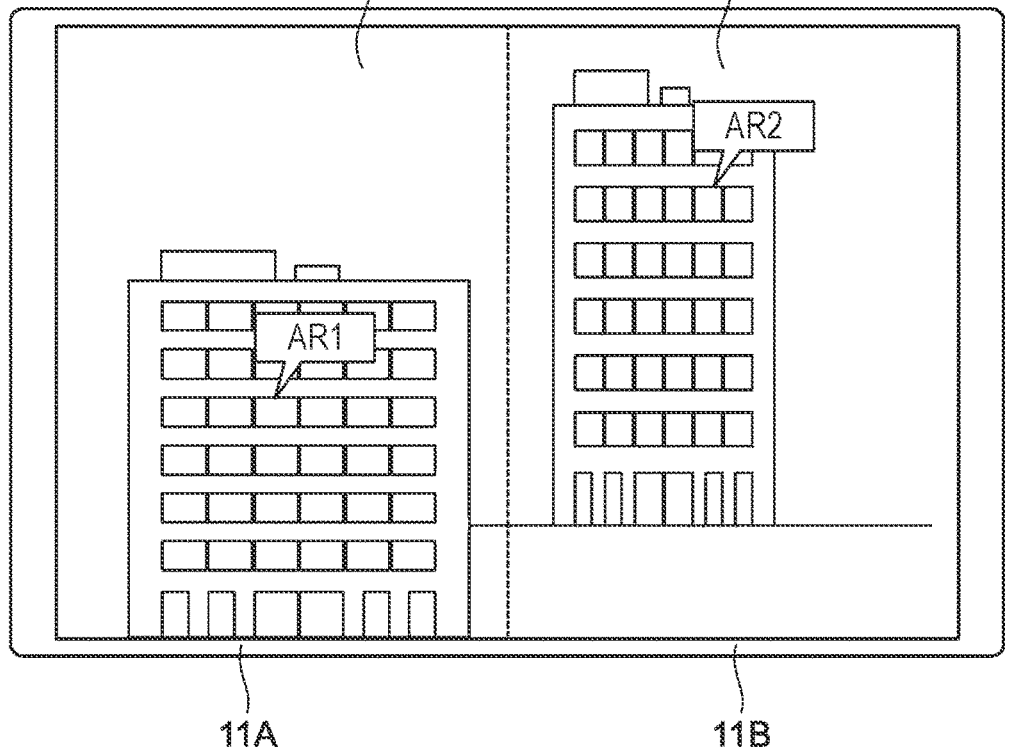

FIGS. 20A and 20B are views for explaining a case where whether or not to display AR content is associated with deformation of the mobile terminal 10A. FIG. 20A illustrates an example of a screen displayed in a state where the display 102 is folded into halves, and FIG. 20B illustrates an example of a screen displayed in a state where the display 102 is unfolded.

In the case of FIGS. 20A and 20B, AR content is not displayed in a case where the display 102 is folded into halves. Meanwhile, in a case where the display 102 is unfolded, AR content is displayed. In other words, in a state where the display surface is reduced to half, only an image taken by a camera 106 (see FIG. 2) is displayed even during use of the AR service. Meanwhile, in a state where the entire display surface is available, AR content is displayed. In FIG. 20B, AR1 is displayed as AR content on a building on a near side, and AR2 is displayed as AR content on a building on a far side.

Screen Example 3

Figure 21A:
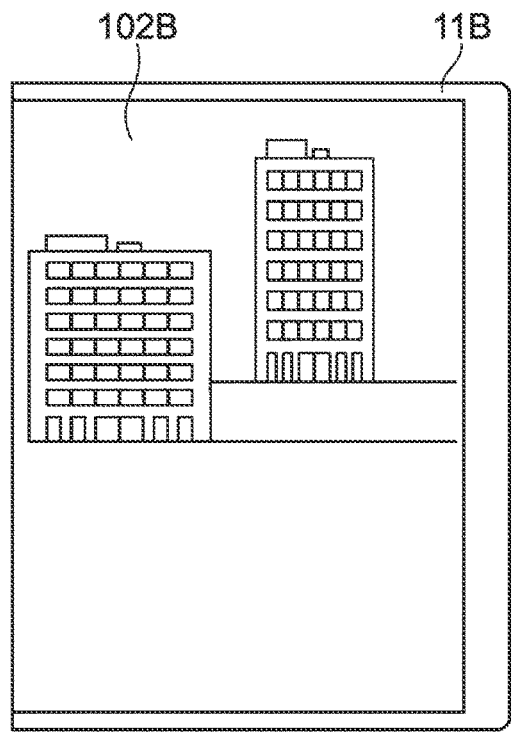
FIGS. 21A and 21B are views for explaining a case where whether or not to display AR content is associated with deformation of the mobile terminal.
Figure 21B:
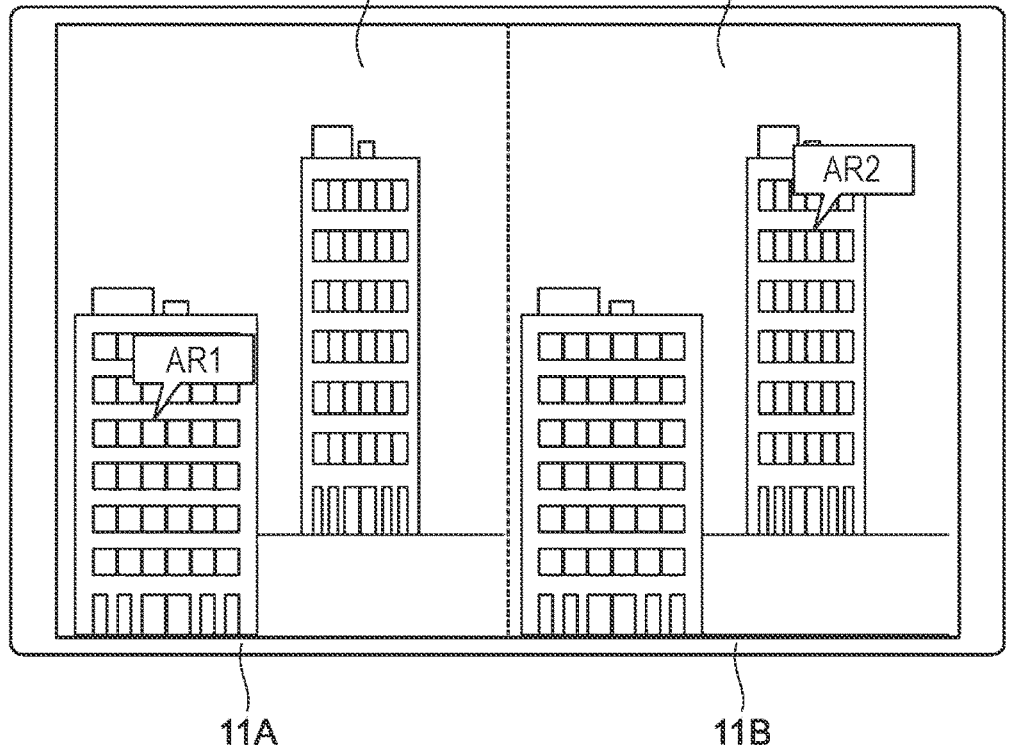

FIGS. 21A and 21B are views for explaining a case where whether or not to display AR content is associated with deformation of the mobile terminal 10A. FIG. 21A illustrates an example of a screen displayed in a state where the display 102 is folded into halves, and FIG. 21B illustrates an example of a screen displayed in a state where the display 102 is unfolded. In FIGS. 21A and 21B, parts corresponding to those in FIGS. 20A and 20B are given corresponding reference signs.

The screen example illustrated in FIGS. 21A and 21B shows a case where AR content is displayed in two regions of the display 102.

In FIG. 21B, AR content of a subject within 10 m from the mobile terminal 10A is displayed in a left region, and AR content of a subject located 10 m or farther away from the mobile terminal 10A is displayed in a right region. In other words, AR content associated with tenants located in a building on a near side is displayed in the left region 102A, and AR content associated with tenants located in a building on a far side is displayed in the right region 102B.

Screen Example 4

FIGS. 22A through 22I) are views for explaining transition of deformation of the mobile terminal 10A and a change of a displayed screen. FIG. 22A illustrates an example of a screen displayed in a state where the display 102 is folded into halves, FIG. 22B illustrates an example of a screen displayed in a state where the display 102 is unfolded, FIG. 22C illustrates an example of a screen displayed in a state where the display 102 is folded into halves again, and FIG. 22D illustrates an example of a screen displayed in a state where the display 102 is unfolded again.

A change from FIG. 22A to FIG. 22B and a change from FIG. 22B to FIG. 22C are identical to a change from FIG. 20A to FIG. 20B and a change from FIG. 20B to FIG. 20A, respectively. A change from FIG. 22B to FIG. 22D is identical to a change from FIG. 21A to FIG. 21B.

This example is a combination or the screen example 2 and the screen example 3 and shows a case where a mode is changed depending on whether the display 102 is unfolded for the first time or the second time.

Figure 23A:
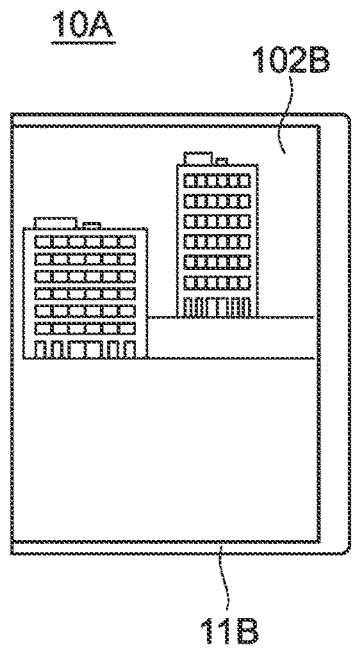
FIGS. 23A through 23D are views for explaining transition of deformation of the mobile terminal and another change of a displayed screen.
Figure 23B:
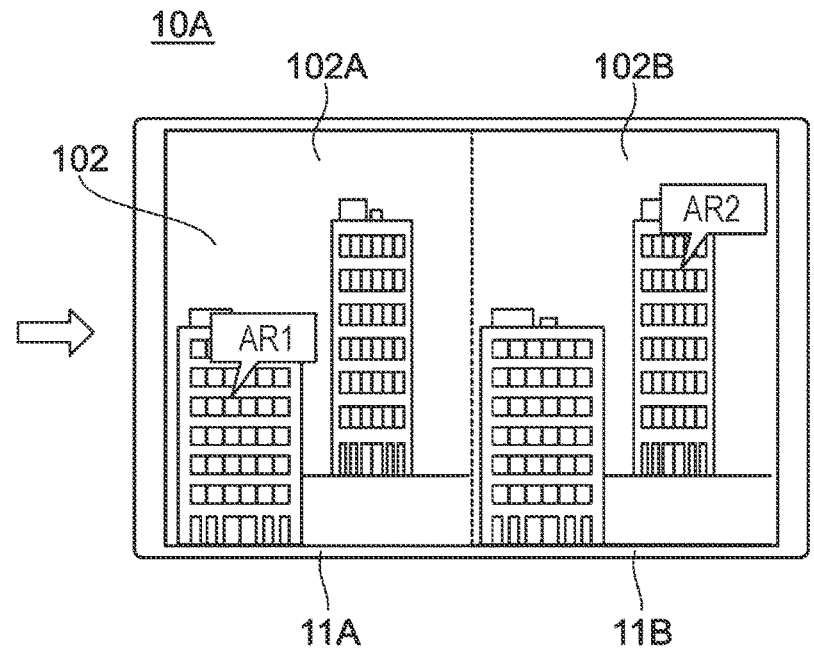
Figure 23C:
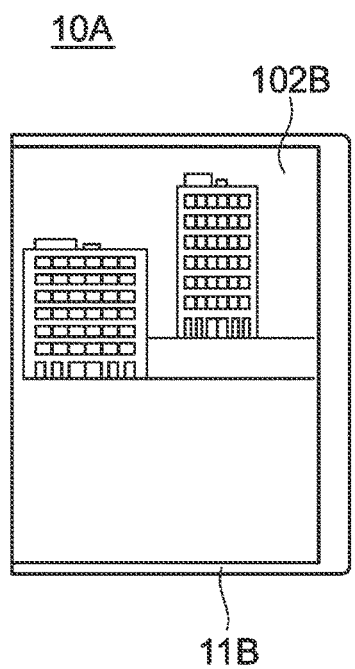
Figure 23D:
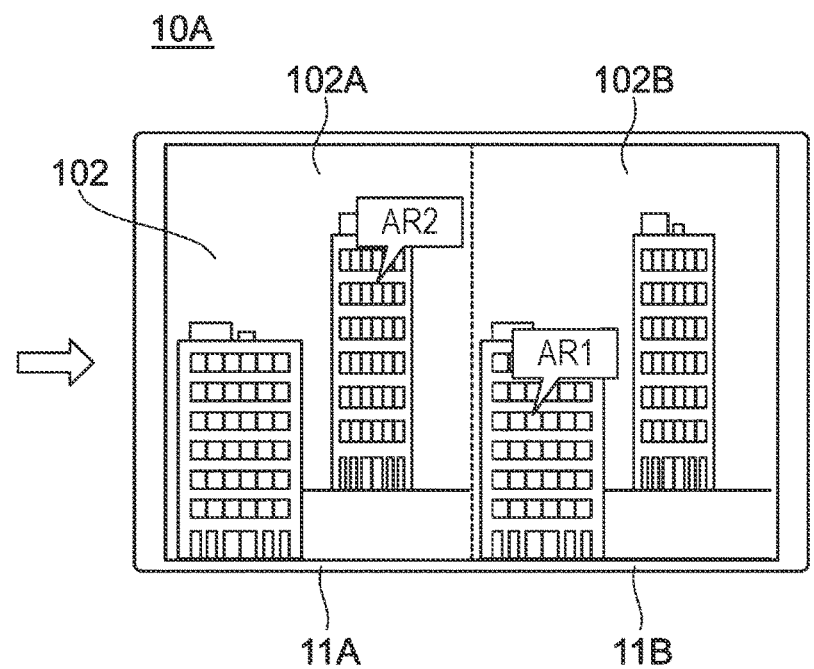

FIGS. 23A through. 23D are views for explaining transition of deformation of the mobile terminal 10A and another change of a displayed screen. FIG. 23A illustrates an example of a screen displayed in a state where the display 102 is folded into halves, FIG. 23B illustrates an example of a screen displayed in a state where the display 102 is unfolded, FIG. 235 illustrates an example of a screen displayed in a state where the display 102 is folded into halves again, and FIG. 23D illustrates an example of a screen displayed in a state where the display 102 is unfolded again.

In FIGS. 23A through 23D, AR content displayed in a left region and AR content displayed in a right region are exchanged with each other between a case where the display 102 is unfolded for the first time from the folded state and a case where the display 102 is unfolded for the second time from the folded state.

Screen Example 5

Figure 24A:
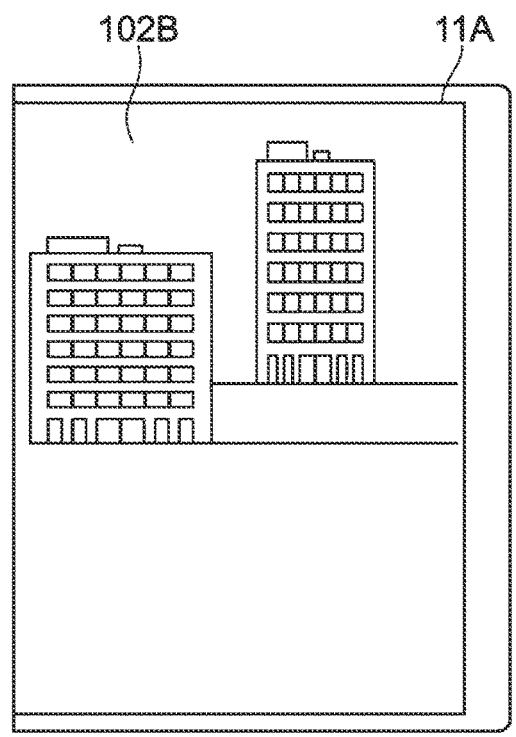
FIGS. 24A and 24B are views for explaining an example of a screen in which deformation of the mobile terminal is used to display an edit screen.
Figure 24B:
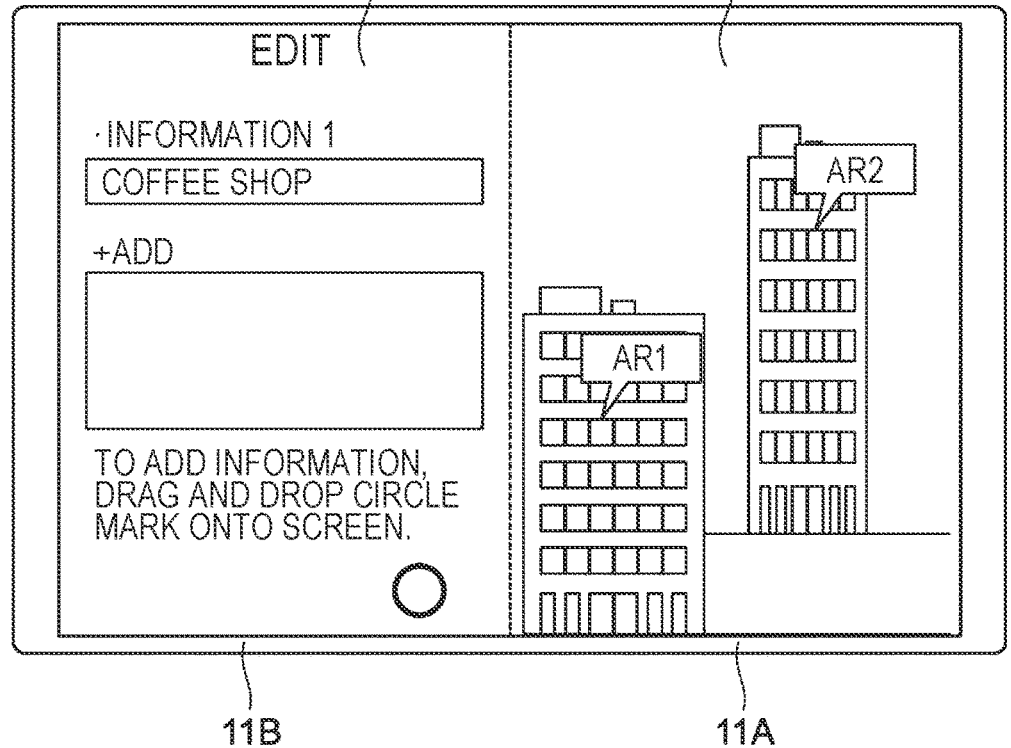

FIGS. 24A and 24B are views for explaining an example of a screen in which deformation of the mobile terminal 10A is used to display an edit screen. FIG. 24A illustrates an example in which a folded state of the display 102 is allocated to display of a taken image, and FIG. 24B illustrates an example in which an unfolded state of the display 102 is allocated to display of an edit screen. In FIGS. 24A and 24B, parts corresponding to those in FIGS. 13A and 13B are given corresponding reference signs.

The screen example illustrated in FIGS. 24A and 24B is an example in which deformation of the display 102 is used to display an edit screen. Note that a layout of the edit screen and an editing action are identical to those in FIGS. 13A and 13B. In the example of FIGS. 24A and 24B, an example of a screen of associated AR content is displayed in the right region 102B.

As described above, according to the mobile terminal 10A whose display 102 is deformable, the deformation can be used to change a display mode. The edit screen is an example of information used to set AR content associated with a subject.

Third Exemplary Embodiment

In the above exemplary embodiments, a case where only one display is provided on a single side of a body has been described. In the present exemplary embodiment, a case where a display is provided on both of a front surface and a rear surface of a body will be described.

Figures 25A, 25B:
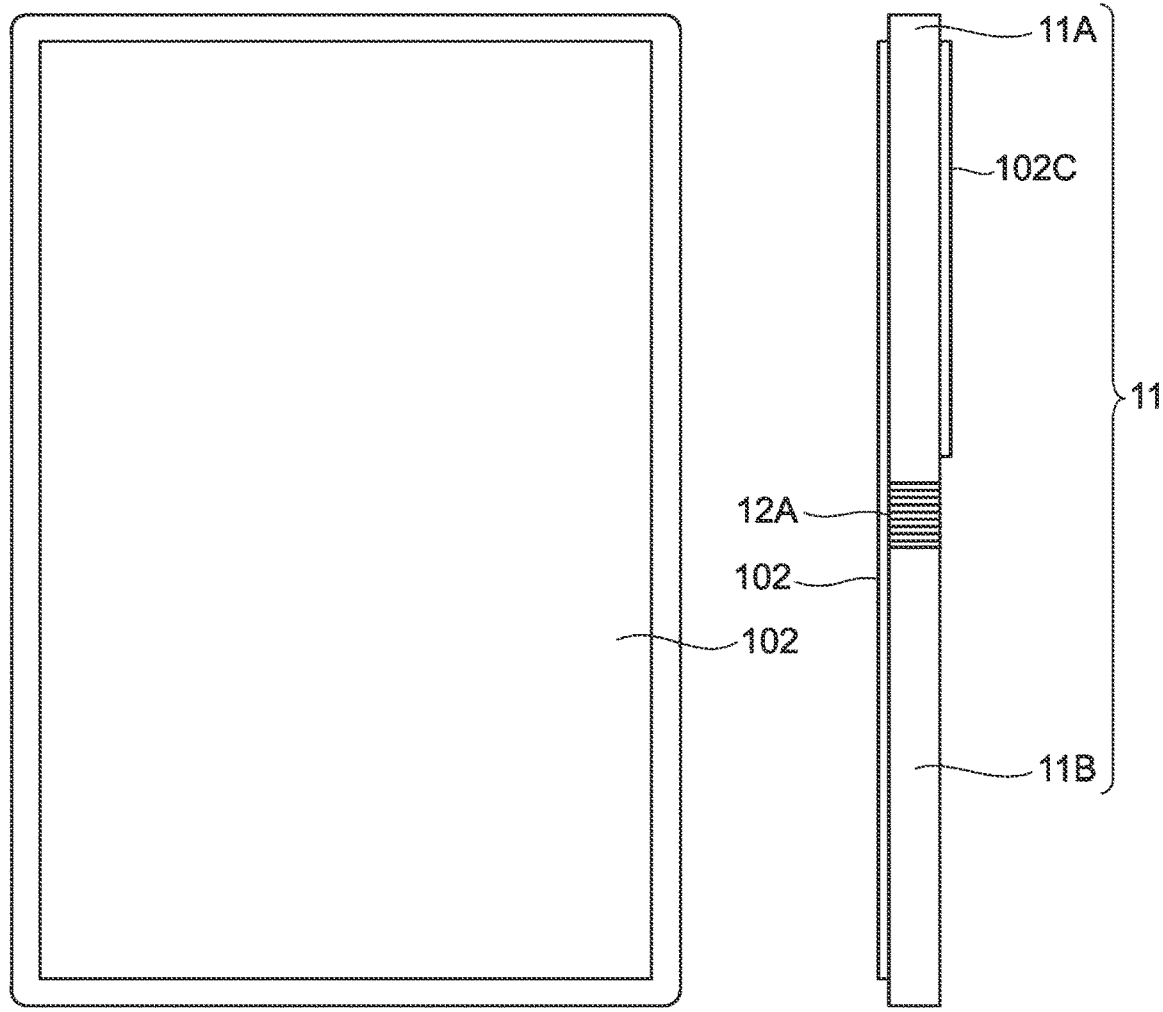
FIGS. 25A and 25B are views for explaining an example of an outer configuration of a mobile terminal used in the third exemplary embodiment.

FIGS. 25A and 25B are views for explaining an example of an outer configuration of a mobile terminal 10B used in the third exemplary embodiment. FIG. 25A is a front view of the mobile terminal 10B, and FIG. 25B is a side view of the mobile terminal 10B. In FIGS. 25A and 25B, parts corresponding to those in FIGS. 16A and 16B are given corresponding reference signs.

The mobile terminal 10B used in the present exemplary embodiment is configured such that a first display 102 is provided on a front surface side of a body 11, and a second display 102C is provided on a rear surface side of the body 11. A size of the second display 102C is about half of a size of the first display 102.

The display 102 of the mobile terminal 10B used in the present exemplary embodiment is also deformable as with the display 102 of the mobile terminal 10A used in the second exemplary embodiment. However, the mobile terminal 10B according to the present exemplary embodiment is folded so that the surface on which the first display 102 is provided becomes a valley side. Than is, a hinge 12A operates in a direction opposite to the hinge 12 used in the second exemplary embodiment.

In the present exemplary embodiment, the mobile terminal 10B is folded so that the first display 102 becomes a valley side. Accordingly, when the mobile terminal 10B is folded, only the second display 102C is observable from an outside. Accordingly, in the state where the mobile terminal 10B is folded, an image is displayed only on the second display 102C.

Figure 26A:
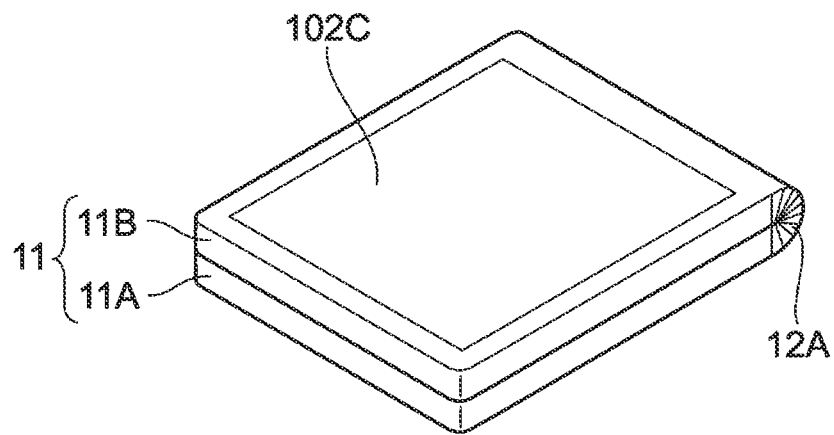
FIGS. 26A and 26B are views for explaining folding deformation of the mobile terminal used in the third exemplary embodiment.
Figure 26B:
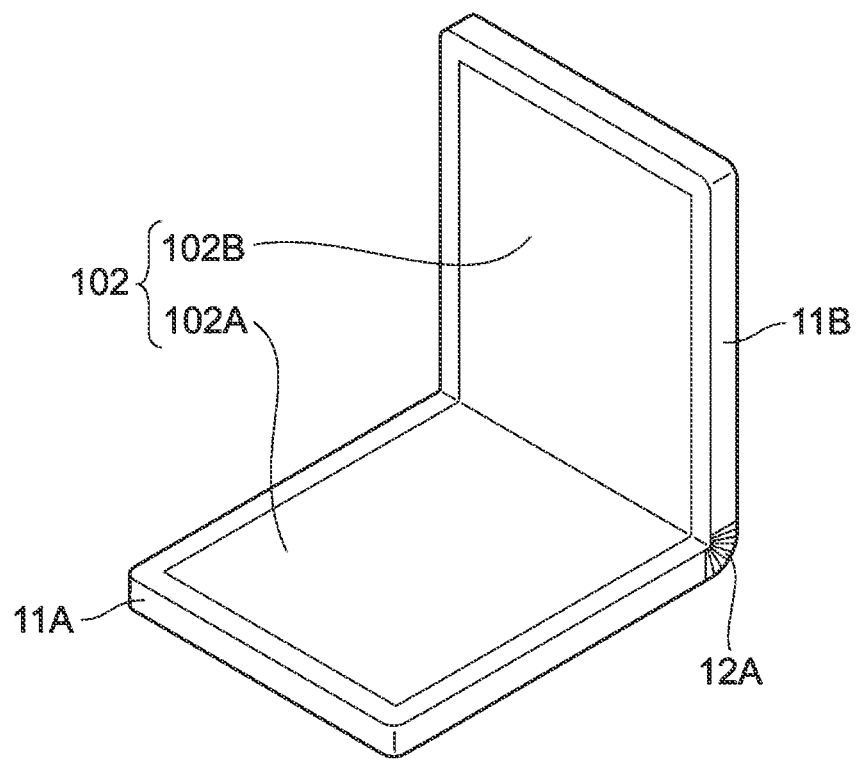

FIGS. 26A and 26B are views for explaining folding deformation of the mobile terminal 10B used in the third exemplary embodiment. FIG. 26A illustrates an example of outer appearance of the mobile terminal 10B that has been folded, and FIG. 26B illustrates an example of outer appearance of the mobile terminal 10B that has not been folded yet.

In the present exemplary embodiment, an image is displayed only on the second display 102C in the state where the mobile terminal 10B is folded. Meanwhile, an image is displayed only on the first display 102 in a state where the mobile terminal 10B is unfolded.

Also in the present exemplary embodiment, deformation of the mobile terminal 10B may be associated with display settings as in the mobile terminal 10A (see FIG. 17) described in the second exemplary embodiment.

Specifically, display settings employed in the state where an image is displayed only on the second display 102C may correspond to the display settings employed in the state where the mobile terminal 10A is folded, and display settings employed in the state where an image is displayed only on the first display 102 may correspond to the display settings employed in the state where the mobile terminal 10A is unfolded.

Other Exemplary Embodiments

The exemplary embodiments of the present disclosure have been described above, but the technical scope of the present disclosure is not limited to the scope described in the above exemplary embodiments. It is apparent from the claims that various changes or modifications of the above exemplary embodiments are also encompassed within the technical scope of the present disclosure.

(1) The above exemplary embodiments have discussed a case where AR content is an image. However, sound may be used as AR content. For example, a sound effect or explanation sound according to a subject may be added. Alternatively, MR content may be added as information associated with a subject within an image taken by a camera 106 instead of the AR content.

The MR content is information that creates mixed reality (MR) whose degree of fusion with a real world is higher than AR. In mixed reality, MR content is associated in a real space like an object in a real world, and therefore plural users can recognize MR content from plural directions at the same time. Examples of the MR content include a signboard, a traffic sign, and a direction board. Furthermore, example of the MR content include image information according to an observation position like an object in a real world.

(2) In the above exemplary embodiments, part or all of processing executed by the AR server 20 (see FIG. 1) in the above description may be executed by the mobile terminal 10 (see FIG. 1), 10A (see FIG. 15), or 10B (see FIG. 25). In this case, the mobile terminal 10 etc. is an example of an information processing apparatus.

Similarly, part or all of processing executed by the mobile terminal 10 etc. in the above description may be executed by the AR server 20.

(3) The above exemplary embodiments have discussed a case where the mobile terminal 10A has a single deformable display 102 (see FIG. 17). However, the display 102 may be constituted by plural panels.

Figure 27A:
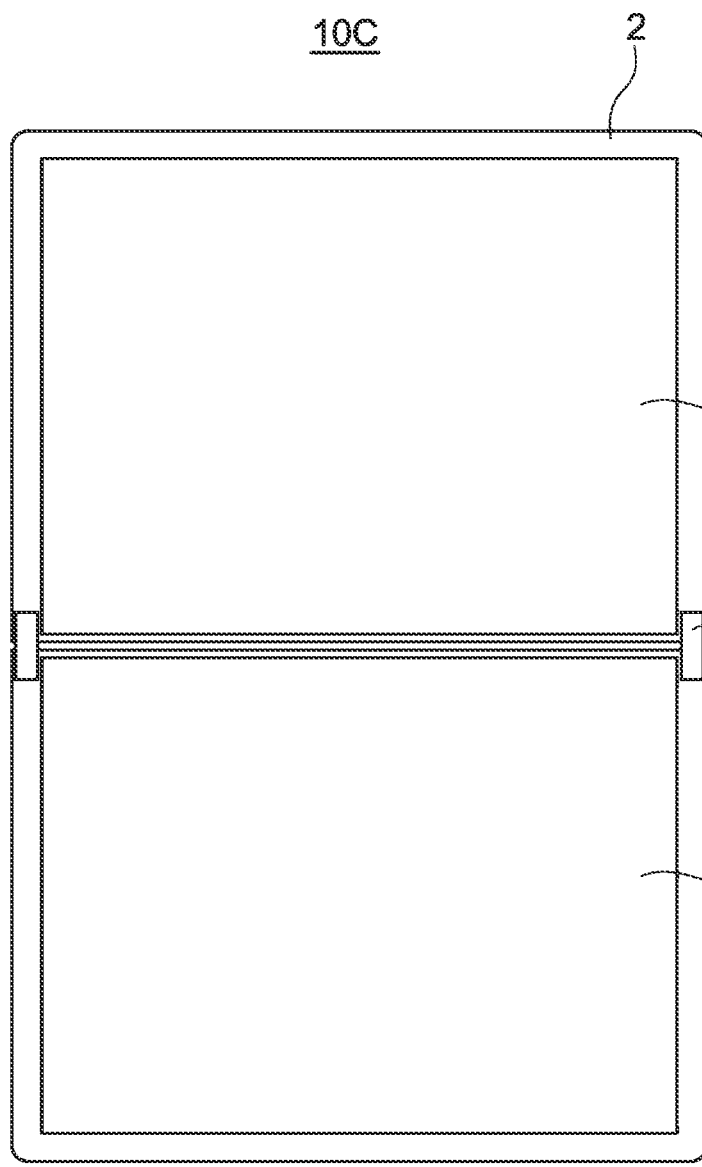
FIGS. 27A and 27B are views for explaining an example of an outer configuration of a mobile terminal used in another exemplary embodiment.
Figure 27B:
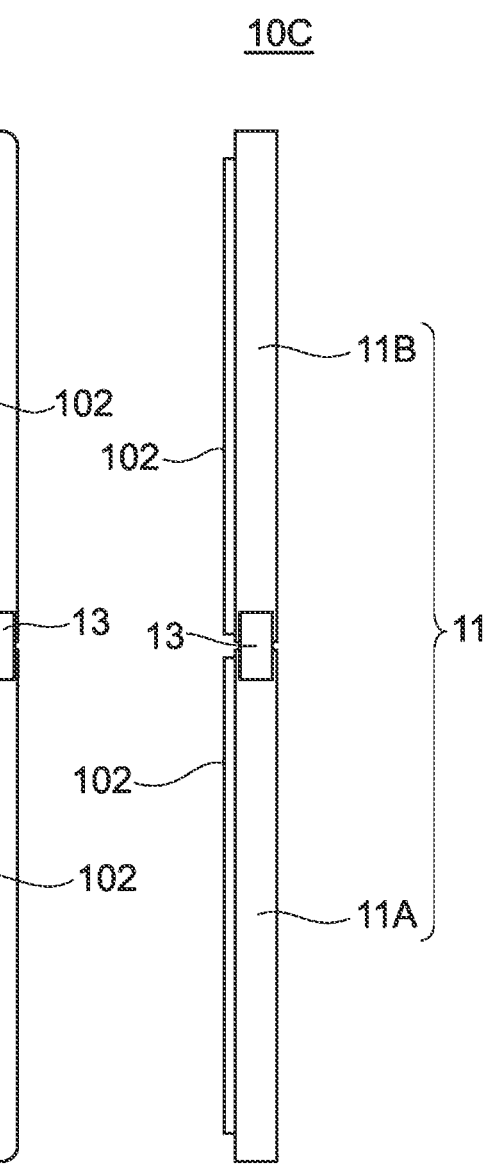

FIGS. 27A and 27B are views for explaining an example of an outer configuration of a mobile terminal 10C used in another exemplary embodiment. FIG. 27A is a front view of the mobile terminal 10C, and FIG. 27B is a side view of the mobile terminal 10C. In FIGS. 27A and 27B, parts corresponding to those in FIGS. 16A and 16B are given corresponding reference signs. The mobile terminal 1C is also an example of an information processing apparatus.

The mobile terminal 10C illustrated in FIGS. 27A and 27B has a display surface that is constituted by two displays 102. A continuous image can be displayed on the two displays 102. The two displays 102 correspond to the left region 102A and the right region 102S, respectively.

In the case of the mobile terminal 10C, two body panels 11A and 11B are attached to a hinge 13 so as to be rotatable in both directions. The hinge 13 has a rotary shaft to which the body panel 11A is attached so as to be rotatable in both directions and a rotary shaft to which the body panel 11B is attached so as to be rotatable in both directions. This allows the mobile terminal 10C to be folded so that the two displays 102 face each other and allows the mobile terminal 10C to be folded so that each of the two displays 102 faces an outer side.

The body panel 11A, the body panel 11B, and the display 102 used in the present exemplary embodiment have high rigidity and are not deformable.

(4) Although the display surface is made deformable into plural shapes by connecting the body panel 11A (see FIGS. 16A and 16B) and the body panel 11B (see FIGS. 16A and 16B), for example, with the use of the hinge 12 (see FIGS. 16A and 16B) in the above exemplary embodiments, the display surface may be deformed by other methods.

Figure 28A:
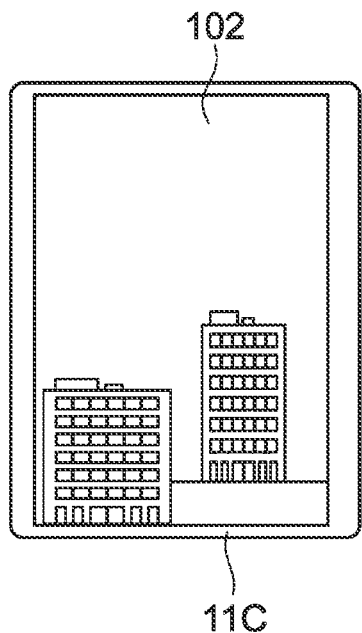
FIGS. 28A through 28C are views for explaining a change of a size of a display surface of the mobile terminal constituted by two body panels that are superimposed on each other.
Figure 28B:
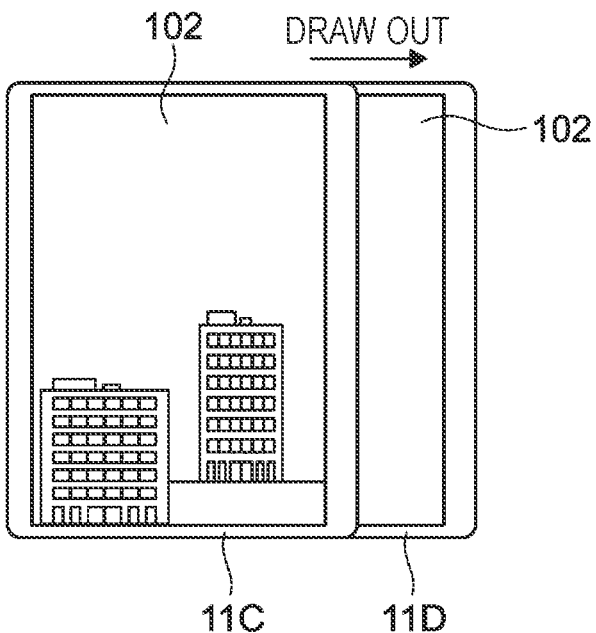
Figure 28C:
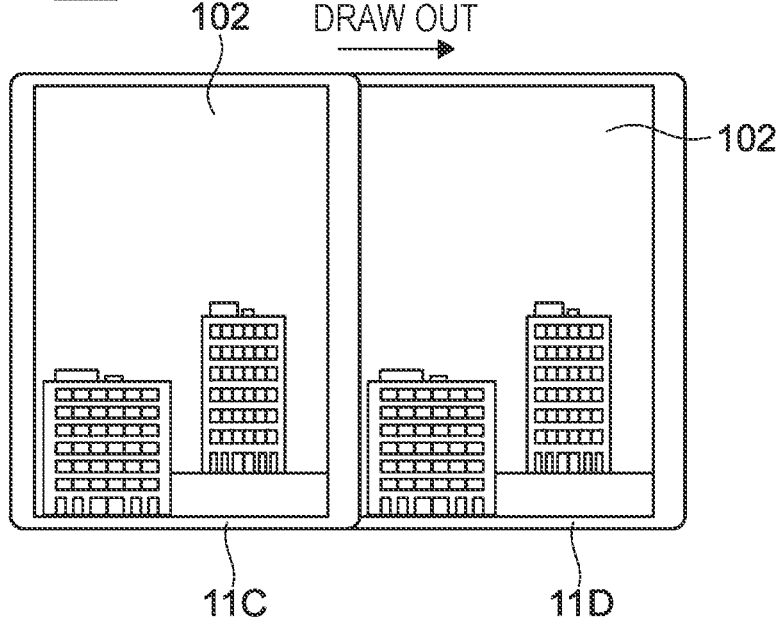

FIGS. 28A through 28C are views for explaining a change of a size of a display surface of a mobile terminal 10D in which two body panels 11C and 11D are disposed on top of each other. FIG. 28A illustrates a state where the body panel 11D is stored below the body panel 11C, FIG. 28B illustrates a state where part of the body panel 11D has been drawn out from below the body panel 11C, and FIG. 28C illustrates a state where the entire body panel 11D has been drawn out.

According to the mobile terminal 10D illustrated in FIGS. 28A through 28C, a shape of the display surface can be deformed by drawing out or storing the body panel 11D. For example, in a case where the body panel 11D is stored below the body panel 11C, the size of the display surface is decided only by a single display 102. Meanwhile, in a case where the body panel 11D is drawn out from the body panel 11C, the size of the display surface can be expanded in accordance with a length of a drawn-out part of the body panel 11D. Note that another display 102 is provided on a front surface of the body panel 11D.

Figure 29:
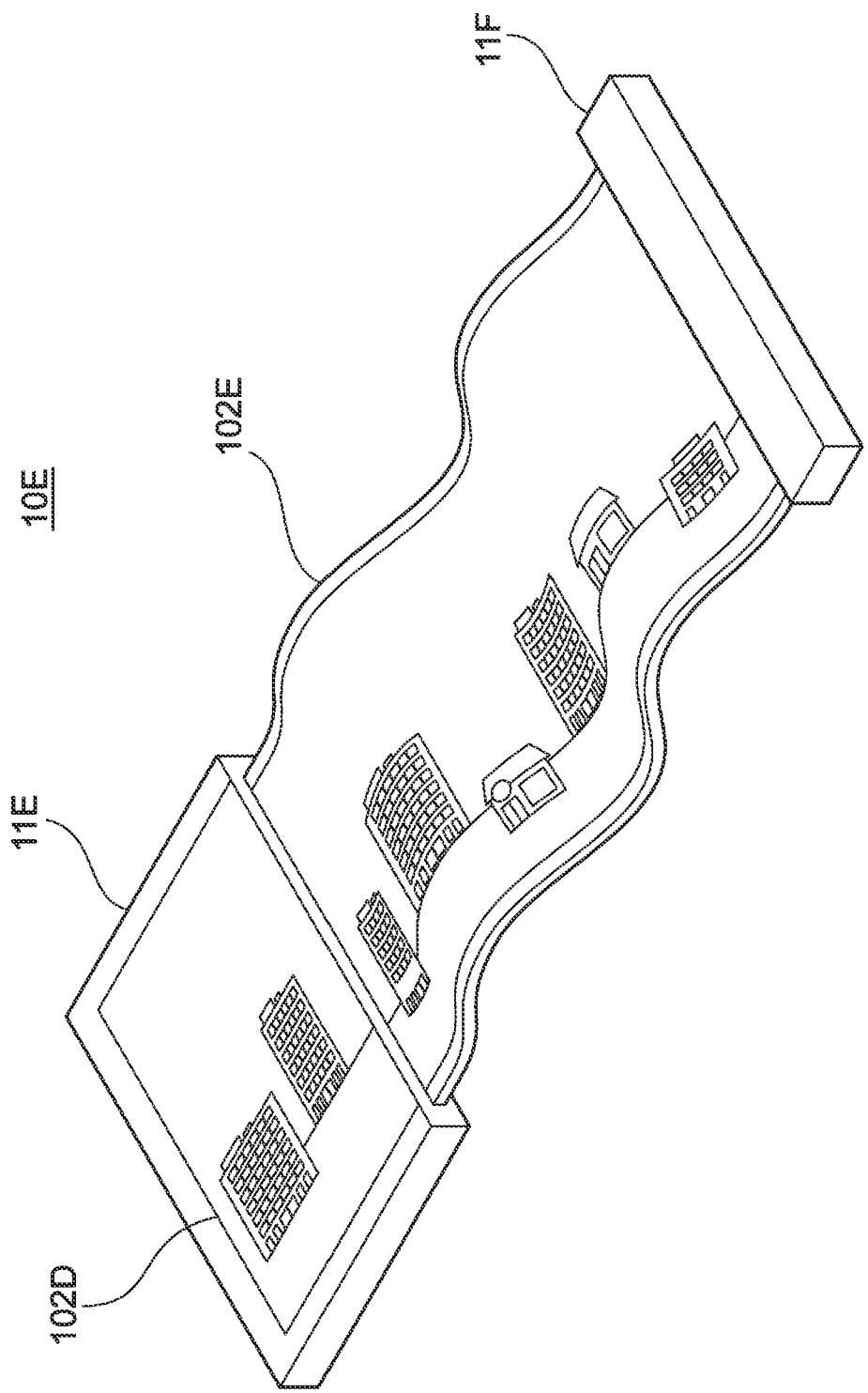
FIG. 29 is a view for explaining an example of outer appearance of a mobile terminal having a draw-out-type display.

FIG. 29 is a view for explaining an example of outer appearance of a mobile terminal 10E that has a draw-out-type display 102E.

The mobile terminal 10E illustrated in FIG. 29 includes a body 11E onto which a display 102D is attached, the deformable display 102E that is contained in the body 11E in a windable manner, and a handle 11F attached to one end of the display 102E.

According to the mobile terminal 10E illustrated in FIG. 29, the size of the display surface can be expanded by drawing the display 102E out from the body 11E with the use or the handle 11F. When the display 102E is stored in the body 11E, the size of the display surface is the size of the display 102D alone.

(5) Although the display 102 (see FIG. 2) divided into plural regions and AR content is displayed in each of the regions in the above exemplary embodiments, an image taken by the camera 106 (see FIG. 2) may be displayed in at least one region without AR content.

Figure 30:
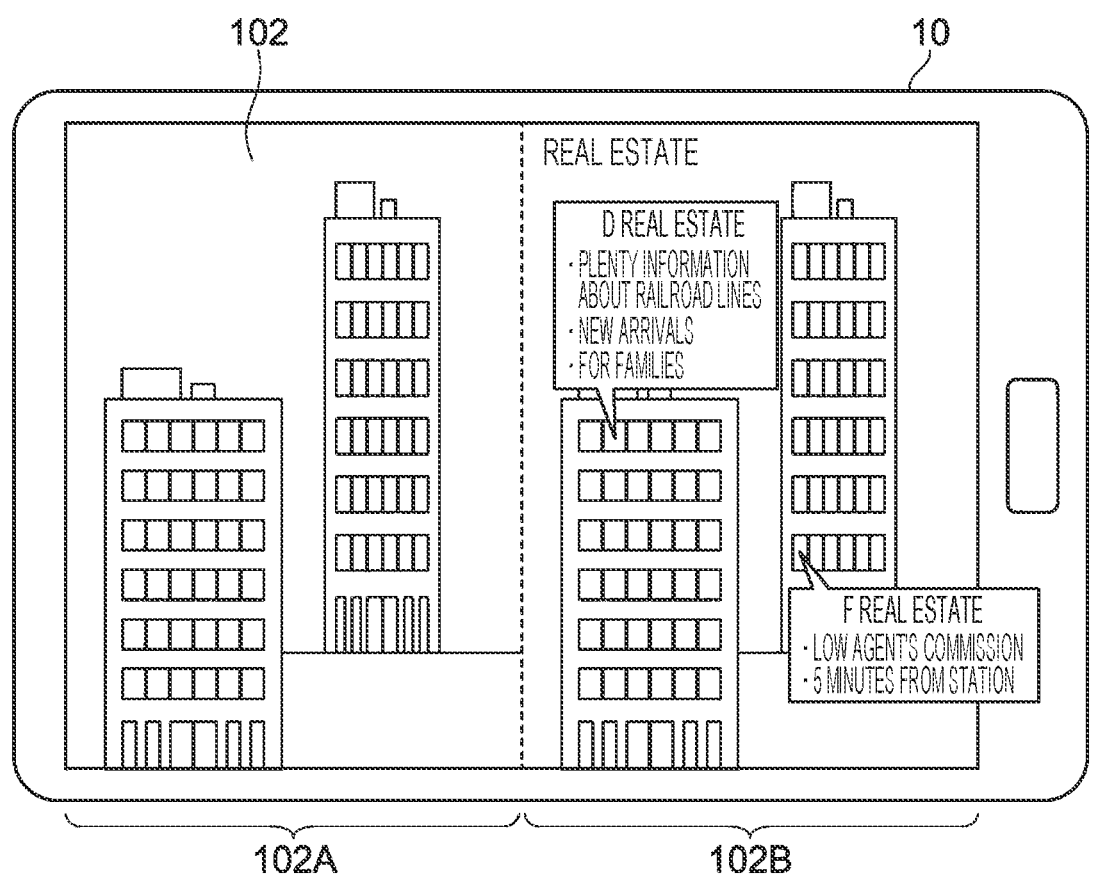
FIG. 30 is a view for explaining an example of a mode in which an image with AR content and an image without AR content are displayed side by side.

FIG. 30 is a view for explaining an example of a mode in which an image with AR content and an image without AR content are displayed side by side. In FIG. 30, parts corresponding to those in FIG. 10 are given corresponding reference signs. In FIG. 30, only an image taken by the camera 106 is displayed in a left region 102A, and the image taken by the camera 106 and AR content associated with a subject are displayed in a right region 102B.

According to this display method, an original image hidden by the AR content can be easily checked.

(6) Although a case where the camera 106 (see FIG. 2) is integral with the mobile terminal 10 (see FIG. 1) has been described in the above exemplary embodiments, the camera 106 may be detachable from the mobile terminal 10 or may be connected to the mobile terminal 10 through wireless communication such as WiFi. Accordingly, for example, the camera 106 may be a live camera or a security camera provided in a city, as long as the camera 106 can be used in the mobile terminal 10.

(7) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising: a processor configured to display an image taken by an imaging device in each of a plurality of regions provided within a display surface and set, for each of the plurality of regions, which information is to be displayed in association with a position of a subject within the image, wherein
    the processor is configured to set which information is to be displayed in association with the subject within the image by using a distance from the imaging device to the subject as a standard, and
    the processor is configured to adjust the standard so that the number of pieces of information displayed in each of the plurality of regions becomes equal to or smaller than a predetermined threshold value.

2. The information processing apparatus according to claim 1, wherein
    the processor is configured to set which information is to be displayed in association with the subject within the image by using a kind of subject as the standard.

3. The information processing apparatus according to claim 1, wherein
    the processor is configured to change the standard in accordance with an instruction from a user.

4. The information processing apparatus according to claim 2, wherein
    the processor is configured to change the standard in accordance with an instruction from a user.

5. The information processing apparatus according to claim 1, wherein
    the processor is configured to change the number of regions in accordance with an instruction from a user.

6. The information processing apparatus according to claim 2, wherein
    the processor is configured to change the number of regions in accordance with an instruction from a user.

7. The information processing apparatus according to claim 1, wherein
    the image is displayed in one of the plurality of regions without information associated with the subject.

8. The information processing apparatus according to claim 1, wherein
    the display surface is deformable into a plurality of shapes; and
    the processor is configured to receive, before deformation of the display surface, settings concerning which information is to be displayed on the display surface after the deformation.

9. The information processing apparatus according to claim 8, wherein
    the processor is configured to receive, before enlarging deformation of the display surface, settings concerning which information is to be displayed on the display surface after the enlarging deformation.

10. The information processing apparatus according to claim 8, wherein
    the processor is configured to receive, before reducing deformation of the display surface, settings concerning which information is to be displayed on the display surface after the reducing deformation.

11. The information processing apparatus according to claim 8, wherein
the processor is configured to, in a case where settings concerning which information is to be displayed are received, display, in one of the plurality of regions, information used to set which information is to be displayed and display, in another one of the plurality of regions, the image in which the information reflecting the settings is associated with the subject.

12. The information processing apparatus according to claim 1, wherein
the processor is configured to, in a case where plural pieces of information are associated with the subject within the image, display the plural pieces of information so that the plural pieces of information do not overlap one another.

13. The information processing apparatus according to claim 12, wherein
the plural pieces of information are shared among the information processing apparatus and other information processing apparatus(es) that are linked to one another.

14. The information processing apparatus according to claim 1, wherein
the display surface is deformable; and
the processor is configured to change allocation of the regions in accordance with deformation of the display surface.

15. The information processing apparatus according to claim 14, wherein
the processor is configured to, in a case where the display surface is changed from a folded state to an unfolded state, divide the display surface into a plurality of regions along a bending part and display the image in each of the plurality of regions.

16. The information processing apparatus according to claim 14, wherein
the processor is configured to increase or decrease the number of regions of the display surface in a case where the display surface is changed from an unfolded state to a folded state and is then changed from the folded state to the unfolded state.

17. The information processing apparatus according to claim 1, wherein
the processor is configured to limit the number of pieces of information displayed on the display surface when a communication speed becomes lower than a predetermined speed in a case where information to be displayed in association with the subject within the image is received from an outside.

18. A non-transitory computer readable medium storing a program causing a computer to execute a process for information processing, the process comprising: displaying an image taken by an imaging device in each of a plurality of regions provided within a display surface and setting, for each of the plurality of regions, which information is to be displayed in association with a position of a subject within the image, wherein the process further comprises:
setting which information is to be displayed in association with the subject within the image by using a distance from the imaging device to the subject as a standard, and
adjusting the standard so that the number of pieces of information displayed in each of the plurality of regions becomes equal to or smaller than a predetermined threshold value.

\* \* \* \* \*